US012537299B2

(12) United States Patent
Güllner

(10) Patent No.: US 12,537,299 B2
(45) Date of Patent: Jan. 27, 2026

(54) CALIBRATED ANTENNA ARRAY

(71) Applicant: Telefonaktiebolaget LM Ericsson (publ), Stockholm (SE)

(72) Inventor: Martin Güllner, Stephanskirchen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 64 days.

(21) Appl. No.: 18/689,571

(22) PCT Filed: Sep. 9, 2021

(86) PCT No.: PCT/EP2021/074802
§ 371 (c)(1),
(2) Date: Mar. 6, 2024

(87) PCT Pub. No.: WO2023/036419
PCT Pub. Date: Mar. 16, 2023

(65) Prior Publication Data
US 2024/0372254 A1 Nov. 7, 2024

(51) Int. Cl.
*H01Q 3/36* (2006.01)
*H01Q 1/24* (2006.01)

(52) U.S. Cl.
CPC ............... *H01Q 3/36* (2013.01); *H01Q 1/246* (2013.01)

(58) Field of Classification Search
CPC ........ H01Q 1/246; H01Q 21/24; H01Q 21/08; H01Q 21/26; H01Q 21/065; H01Q 21/061;
(Continued)

(56) References Cited

U.S. PATENT DOCUMENTS 5,657,023 A 8/1997 Lewis et al.
6,133,868 A * 10/2000 Butler .................... H01Q 3/267 342/372
(Continued)

FOREIGN PATENT DOCUMENTS

CN 104393389 A 3/2015
CN 105356052 A 2/2016
(Continued)

OTHER PUBLICATIONS

Date: Dec. 15, 2017, Inventors Luo Shengjun, CN107482320A 5G large-scale array antenna, p. 1-11 (Year: 2017).*
(Continued)

*Primary Examiner* — Wei (Victor) Y Chan
(74) *Attorney, Agent, or Firm* — Withrow & Terranova, PLLC

(57) ABSTRACT

An antenna comprising first and second dual polarized radiator elements forming a first subarray, and third and fourth dual polarized radiator elements forming a second subarray. The antenna further comprises a calibration unit coupled to the first and second subarrays that is configured, based on a coupling signal generatable, during operation of the antenna, between the first and second subarrays, to generate or receive a calibration signal for calibrating one or both of the first subarray with respect to the second subarray and the second subarray with respect to the first subarray. The antenna further comprises one or both of (i) a first coupler electrically coupling the first and second dual polarized radiator elements to each other, and (ii) a second coupler electrically coupling the third and fourth dual polarized radiator elements to each other. A said coupler is configured to flatten a frequency response of the coupling signal.

18 Claims, 25 Drawing Sheets

(58) Field of Classification Search
CPC ............ H01Q 5/42; H01Q 3/26; H01Q 25/00; H01Q 3/267; H01Q 21/0025; H01Q 3/40
See application file for complete search history.

(56) References Cited

U.S. PATENT DOCUMENTS

| | | | | |
|---|---|---|---|---|
| 8,009,095 | B2 | 8/2011 | Schlee et al. | |
| 8,654,883 | B2 * | 2/2014 | Harel | H04B 7/0617 375/267 |
| 2007/0205955 | A1 * | 9/2007 | Korisch | H01Q 21/24 343/797 |
| 2011/0248796 | A1 * | 10/2011 | Pozgay | H01Q 25/02 333/137 |
| 2016/0049995 | A1 * | 2/2016 | André | H04B 7/04 370/277 |
| 2020/0044345 | A1 * | 2/2020 | Zimmerman | H04W 16/28 |
| 2020/0220628 | A1 | 7/2020 | Vella-Coleiro | |
| 2022/0131578 | A1 * | 4/2022 | Junttila | H01Q 21/24 |
| 2023/0170957 | A1 * | 6/2023 | Zimmerman | H04B 7/10 455/101 |
| 2023/0238707 | A1 * | 7/2023 | Wu | H01Q 9/285 343/702 |
| 2023/0361807 | A1 * | 11/2023 | Dunn | H04B 1/405 |
| 2023/0369782 | A1 * | 11/2023 | Göttl | H01Q 21/26 |
| 2024/0047861 | A1 * | 2/2024 | Zimmerman | H01Q 3/26 |
| 2024/0291137 | A1 * | 8/2024 | Kasani | H01Q 3/36 |

FOREIGN PATENT DOCUMENTS

| | | | |
|---|---|---|---|
| CN | 107482320 | A | 12/2017 |
| WO | 2013187811 | A1 | 12/2013 |

OTHER PUBLICATIONS

Date: Dec. 15, 2017, Inventors Luo Shengjun, CN107482320A 5G large-scale array antenna, p. 1-11 (Translation) (Year: 2017).*
Bekers, et al., "Mutual-Coupling Based Phased-Array Calibration: A Robust and Versatile Approach," International Symposium on Phased Array Systems and Technology, Oct. 15-18, 208 13, Waltham, Massachusetts, IEEE, pp. 630-637.
Hamdy, Mohamed, "An introduction to LTE Smart base station antennas," Mobility Network Engineering, Feb. 2017, Commscope, Inc, 15 pages.
Sorace, Ron, "Phased Array Calibration," IEEE Transactions on Antennas and Propagation, vol. 49, Issue 4, Apr. 2001, pp. 517-525.
International Search Report and Written Opinion for International Patent Application No. PCT/EP2021/074802, mailed Jun. 3, 2022, 17 pages.

* cited by examiner

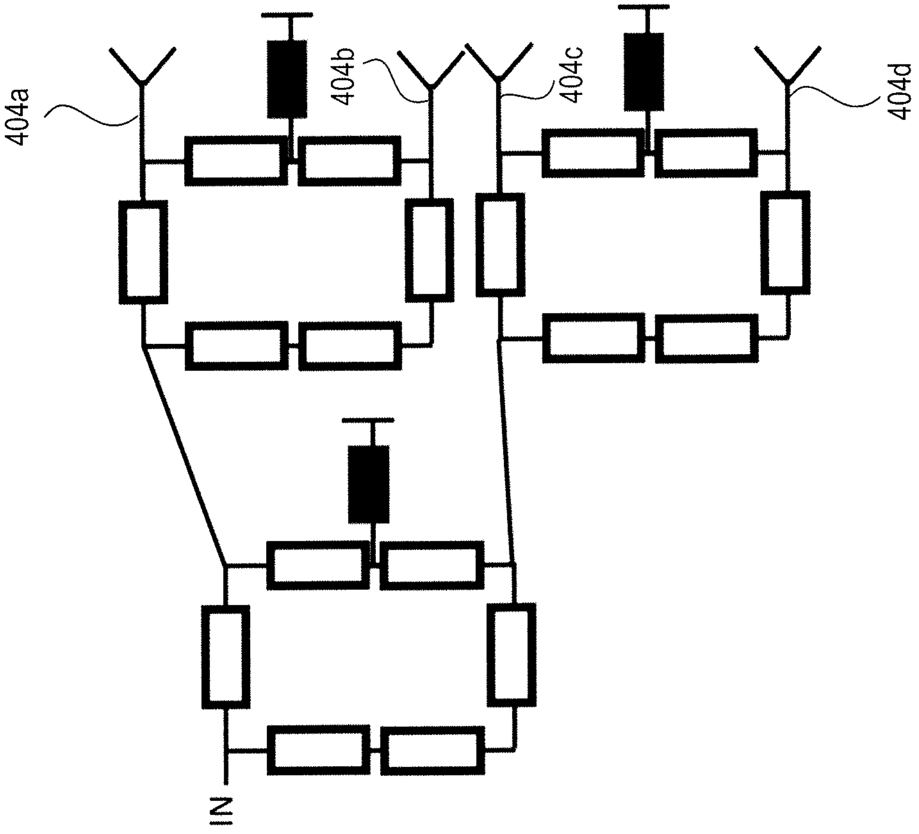
FIG. 15
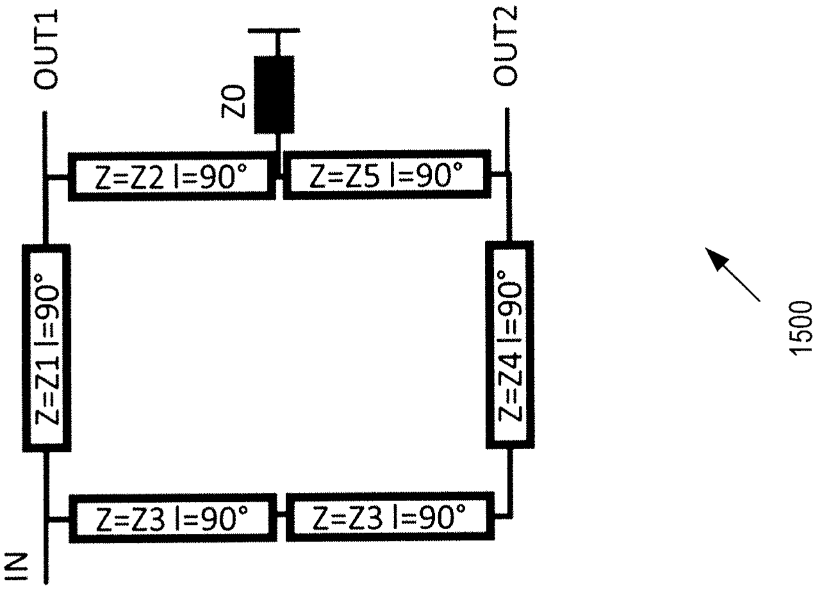

CALIBRATED ANTENNA ARRAY

This application is a 35 U.S.C. § 371 national phase filing of International Application No. PCT/EP2021/074802, filed Sep. 9, 2021, the disclosure of which is incorporated herein by reference in its entirety.

TECHNICAL FIELD

The present disclosure generally relates to an antenna array. In more detail, aspects of the present disclosure relate to an antenna array in which a coupling signal generated, during operation of the antenna, between subarrays of respective dual polarized radiator elements is used for phase calibration between the subarrays, while a coupler is provided in order to flatten a frequency response of the coupling signal.

BACKGROUND

In massive multiple-input, multiple-output (MIMO) technologies, a calibration routine is needed in order to consider phase variations of the different signal branches of the antenna. State of the art technologies use a calibration network at the antenna side. Calibration can also be performed using signal coupling generated between different antenna branches. This calibration algorithm is called mutual coupling calibration.

State of the art calibration routines use a calibration network in the antenna. At each branch in the antenna, a radio-frequency (RF) coupler is placed. A portion of the antenna signal is coupled out and fed to a calibration combiner. Combined calibration signals are fed back to the base station/radio unit and used to align all massive MIMO signals.

FIG. 1 shows a system 100 comprising an antenna 102 and radiator elements 104*a-d*. A base station/radio unit 106 is coupled to the antenna 102 via respective branches 108*a-d*. A calibration signal 110 is provided by the antenna 102 to the base station/radio unit 106. As outlined above, a portion of the antenna signal may be coupled out and fed to a calibration combiner. As is shown in the system 200 in FIG. 2, a calibration network 202 is provided, from where the calibration signal 110 is sent to the base station/radio unit 106. Such implementation is shown i.e. in U.S. Pat. No. 8,009,095 B2, whereas the portion of the antenna signal is coupled by means of directional couplers and selected by means of a switch. A separate feedback branch is needed for the calibration of the antenna in such an implementation.

Such a calibration routine may work well in existing massive MIMO systems. However, higher costs and complexity for such calibration networks in the antennas may be considered. Oftentimes, these special calibration networks may need to be electrically shielded to achieve good signal quality. Such shielding may also increase costs and complexity. Further prior art can be found, for example, in U.S. Pat. No. 7,362,266 B2, which generally relates to a mutual coupling method for calibrating a phased array.

SUMMARY

Accordingly, there is a need to address the above.

According to a first aspect, an antenna is provided which comprises a first dual polarized radiator element and a second dual polarized radiator element. The first dual polarized radiator element and the second dual polarized radiator element form a first subarray. The antenna further comprises a third dual polarized radiator element and a fourth dual polarized radiator element, wherein the third dual polarized radiator element and the fourth dual polarized radiator element form a second subarray which is different from the first subarray. The antenna further comprises a calibration unit coupled to both of the first subarray and the second subarray, wherein the calibration unit is configured, based on a coupling signal generatable, during operation of the antenna, between the first subarray and the second subarray, to generate or receive a calibration signal for calibrating, by the calibration unit, one or both of the first subarray with respect to the second subarray and the second subarray with respect to the first subarray, the calibration relating to a phase difference between a first electrical signal provided to the first subarray and a second electrical signal provided to the second subarray during operation of the antenna. In some examples, the calibration unit may be coupled to the first and second subarray, respectively, using existing feeding branches to the subarrays. In some examples, the calibration unit may be part of the signal processing unit and may use the same hardware resources as the signal processing unit for the operation signals, as, e.g., generators, oscillators and amplifiers—as in a mutual coupling arrangement the same paths are used, which are intended for the transmission and reception of the operating signals. Such a calibration unit can therefore also be realized as a virtual unit. The antenna further comprises one or both of (i) a first coupler electrically coupling the first dual polarized radiator element and the second dual polarized radiator element to each other, and (ii) a second coupler electrically coupling the third dual polarized radiator element and the fourth dual polarized radiator element to each other. A said coupler is configured to flatten a frequency response of the coupling signal, based on which the calibration signal is generated or received by the calibration unit, generatable, during operation of the antenna, between the first subarray and the second subarray.

In order to achieve lower antenna and overall costs, calibration methods according to the present disclosure may be performed without calibration networks in the antenna. Here, a different calibration algorithm may achieve lower complexity and costs. Antenna calibration using mutual coupling is thus of high interest. Depending on the antenna design and, in some examples, especially the distance between the different antenna columns (subarrays), mutual coupling may lead to a cross talk between the different antenna branches. In general, the signals coming from the base station/radio unit travel to the antenna and are radiated. A portion of these signals also couple to the neighboring antenna column(s) and are fed back to the antenna and the base station/radio unit. These signals may be detected in the base station/radio unit, for example with an RF coupler at the mainboard. Using these feedback signals, one can determine the correct phase of each signal branch. It is hereby to be noted that any examples of the present disclosure may also be incorporated where the base station or the radio unit are integrated into the antenna.

The inventor has realized that in an antenna there may be different influences on the frequency response of the mutual coupling signal(s), such as, for example, one or more of the distance of the dipoles from each other, the antenna feeding network, the dipole separation/side walls, the dipoles themselves, and the radome and/or distance of radome to the dipoles. All these parameters may affect the frequency response of these mutual coupling signals. In particular by using a said coupler which is configured to flatten a frequency response of the coupling signal, based on which the calibration signal is generated or received by the calibration unit, generatable, during operation of the antenna, between the first subarray and the second subarray, the calibration may be improved for mutual coupling calibration in particular in massive MIMO networks. Complexity and costs may also be reduced and antenna performance may be improved based on the improved calibration. The wording during operation of the antenna may, in some examples, mean that the antenna does not need to be switched into a separate calibration mode for a longer time, but may also include that a dedicated time frame within the normal frame structure of the used transmission protocol can be used for the transmission of the calibration signal.

In some examples of the antenna, a said coupler being configured to flatten the frequency response of the coupling signal comprises reducing a frequency-dependency of an amplitude of the coupling signal (compared to when no coupler is provided or when only one or more T-splitters are provided in the antenna feeding network). The calibration based on (mutual) coupling may thus be improved.

In some examples of the antenna, dual polarized radiator elements in one of said subarrays are connected by means of fixed short lines together and therefore are in a fixed and defined phase constellation. As a result, in some examples, dual polarized radiator elements which are comprised in the same subarray do not necessarily have to be calibrated against each other.

In some examples of the antenna, two or more subarrays can be connected via variable phase shifters, which are configured to operate synchronously for all subarrays. In this case, the resulting subarrays including the phase shifters but with separate inputs can be calibrated against each other.

In some examples of the antenna, one or both of the first coupler and the second coupler comprises a respective divider comprising decoupled outputs which are electrically coupled to respective ones of the dual polarized radiator elements. This allows for easy and low-cost implementation of the coupler(s) so as to flatten the frequency response of the coupling signal.

In some examples of the antenna, a said divider comprises a Wilkinson power divider. Such dividers use a resistor between the two outputs which terminates signals at the output that are out of phase to each other, such that the flattening of the frequency response of the coupling signal may be improved.

In some examples of the antenna, a said divider comprises a Gysel combiner, a Kouzoujian splitter, a Branch-line combiner or a Branch-line coupler. These dividers also have decoupled outputs allowing for a flat frequency response of the mutual coupling signal for improved calibration of the subarrays.

In some examples of the antenna, a first said divider is comprised in a first divider network electrically coupled to the dual polarized radiator elements of the first subarray and/or wherein a second said divider is comprised in a second divider network electrically coupled to the dual polarized radiator elements of the second subarray. With such a divider network, the frequency response may be flattened to improve calibration across all subarrays of the antenna, thereby resulting in improved performance of the antenna.

In some examples of the antenna, a said divider comprises an unequal magnitude split divider. This means that different branches of such a divider may comprise different impedances. Unequal magnitude split dividers may allow for reaching an amplitude aperture for an antenna array.

In some examples, the antenna further comprises a combiner network electrically coupled to the subarrays via corresponding, respective signal lines for adapting a phase length for the dual polarized radiator elements of the subarrays. In some examples, this may allow for providing a specific downtilt of the antenna, which may be adjusted via a phase shifter.

In some examples, the antenna further comprises a third subarray comprising a fifth dual polarized radiator element and a sixth dual polarized radiator element, and wherein the first subarray and the second subarray are neighboring subarrays. For neighboring subarrays, the mutual coupling signal may be large compared to mutual coupling signals generated, during operation of the antenna, between non-neighboring subarrays, such that the calibration of the phase between the (neighboring) subarrays may be improved.

In some examples of the antenna, the subarrays of dual polarized radiator elements are arranged in a matrix in which the subarrays form columns of the matrix. Radiator elements in particular in neighboring subarrays may be calibrated with respect to each other.

In some examples, if a number of dual polarized radiator elements in a said column is n, a number of dividers of a said divider network is n−1. This allows improved calibration of all dual polarized radiator elements in one subarray. In some examples, the number of dividers of a said divider network is at least 3.

In some examples, the matrix comprises i rows and j columns of dual polarized radiator elements, wherein $i \geq 2$ and $j \geq 2$, and wherein the calibration of a said dual polarized radiator element of a said subarray located at a position (i,j) in the matrix is based on the respective coupling signal radiated, during operation of the antenna, between the dual polarized radiator element at the position (i,j) and any dual polarized radiator elements located at positions (i,j−1) and (i,j+1), if the corresponding position is occupied by a said dual polarized radiator element. If no dual polarized radiator element is located at the position (i,j−1) or (i,j+1), this means that the corresponding dual polarized radiator element at position (i,j) may be arranged at the edge of the antenna. In these examples, calibration may be performed based on nearest neighbored dual polarized radiator elements in neighboring subarrays.

In some examples, the calibration of the dual polarized radiator element of a said subarray located at the position (i,j) is further based on the respective coupling signal radiated, during operation of the antenna, between the dual polarized radiator element at the position (i,j) and any dual polarized radiator elements located at positions (i−1,j−1), (i−1,j+1), (i+1,j−1) and (i+1,j+1), if the corresponding position is occupied by a said dual polarized radiator element. Again, the latter positions are occupied if the position (i,j) is not an edge position of the dual polarized radiator elements of the antenna. In these examples, a (reference) radiator may be used for the calibration. In these examples, dual polarized radiator elements of neighboring subarrays that are arranged at a diagonal location with respect to the dual polarized radiator element at position (i,j) are taken into account in the calibration based on the mutual coupling signal(s) being radiated between those dual polarized radiator elements arranged diagonally with respect to each other. This may result in improved calibration based on further mutual coupling signals being taken into account.

In some examples, the calibration of the dual polarized radiator element of the subarray located at the position (i,j) is further based on the respective coupling signal radiated, during operation of the antenna, between the dual polarized radiator element at the position (i,j) and any dual polarized radiator elements located at positions (i,j−x), and (i,j+x), wherein x is 2, if the corresponding position is occupied by a said dual polarized radiator element, and/or any dual polarized radiator elements located at positions (i,j−y), and (i,j+y), wherein y is 3, if the corresponding position is occupied by a said dual polarized radiator element. This allows for taking further mutual coupling signals of non-nearest neighbors into account for improved calibration.

In some examples, the matrix comprises four columns of dual polarized radiator elements, wherein the calibration comprises calibrating each column of dual polarized radiator elements with respect to every other column of dual polarized radiator elements. Taking into account mutual coupling signals between all columns allows for further improvements to the calibration of the subarrays of the antenna.

In some examples, the calibration of one of the columns of dual polarized radiator elements comprises calibrating said column of dual polarized radiator elements based on an average value of coupling signals radiated, during operation of the antenna, between said one of the columns of dual polarized radiator elements and corresponding, respective neighboring columns of dual polarized radiator elements.

In some examples, a said dual polarized radiator element is configured to radiate a signal with a first polarization and a second polarization, wherein the first polarization is different from the second polarization, and wherein the calibration of one or both of the first subarray with respect to the second subarray and the second subarray with respect to the first subarray, based on the coupling signal, is based on the coupling signal being radiated by one or both of a said dual polarized radiator element of the first subarray and a said dual polarized radiator element of the second subarray radiating a corresponding signal with the first polarization. Performing the calibration based on a particular polarization may improve the calibration for improved performance of the antenna.

In some examples, the calibration of one or both of the first subarray with respect to the second subarray and the second subarray with respect to the first subarray, based on the coupling signal, is further based on the coupling signal being radiated by one or both of a said dual polarized radiator element of the first subarray and a said dual polarized radiator element of the second subarray radiating a corresponding signal with the second polarization. This may further improve calibration of the subarrays, based on the different coupling signals being radiated, in relation to respective dual polarized radiator elements radiating signals with different polarizations.

In some examples, a said dual polarized radiator element is configured to radiate a signal with a first polarization and a second polarization, wherein the first polarization is orthogonal to the second polarization, and wherein the calibration unit is configured to calibrate the first subarray and the second subarray with respect to each other in relation to one or more of the dual polarized radiator elements of the first subarray radiating a said signal with the first polarization and one or more of the dual polarized radiator elements of the second subarray radiating a said signal with the second polarization during operation of the antenna. A plurality of coupling signals stemming from different subarrays radiating signals with different polarizations may be taken into account, thereby improving performance of the antenna based on improved calibration of the subarrays with respect to each other.

In some examples, a said dual polarized radiator element is configured to radiate a signal with a first polarization and a second polarization, wherein the first polarization is orthogonal to the second polarization, and wherein the calibration unit is configured to (i) calibrate the first dual polarized radiator element and the second dual polarized radiator element with respect to each other in relation to the first dual polarized radiator element radiating a said signal with the first polarization and the second dual polarized radiator element radiating a said signal with the second polarization during operation of the antenna, and/or (ii) calibrate the third dual polarized radiator element and the fourth dual polarized radiator element with respect to each other in relation to the third dual polarized radiator element radiating a said signal with the first polarization and the fourth dual polarized radiator element radiating a said signal with the second polarization during operation of the antenna. Different polarizations of signals radiated by different dual polarized radiator elements of one subarray may be calibrated.

In some examples, the calibration unit is configured to calibrate one or both of the first subarray with respect to the second subarray and the second subarray with respect to the first subarray based on the coupling signal being radiated, during operation of the antenna, by both of (i) a said dual polarized radiator element of the first subarray radiating a signal with the dual polarized radiator elements of the second subarray not radiating a signal at the same time, and (ii) a said dual polarized radiator element of the second subarray radiating a signal with the dual polarized radiator elements of the first subarray not radiating a signal at the same time. The coupling signals are thus well defined, allowing for precise calibration of the subarrays with respect to each other. In some examples, the calibration unit is configured to calibrate one or both of the first subarray with respect to the second subarray and the second subarray with respect to the first subarray based on the coupling signal being radiated, during operation of the antenna, by each column of dual polarized radiator elements radiating a signal with all other columns of dual polarized radiator elements not radiating a signal at the same time. This allows for further improvements to the calibration of all subarrays with respect to each other. In some examples, the calibration unit is configured to solve a phase-data matrix, generated from the coupling signals radiated from each column of dual polarized radiator elements radiating a signal with all other columns of dual polarized radiator elements not radiating a signal at the same time, and calculate phase information between all columns of dual polarized radiator elements for adapting the phase for performing beam forming of a beam emittable by the antenna. Beamforming may thus be more precise due to improved calibration of the subarrays with respect to each other.

In some examples, the calibration unit is configured to calibrate a said subarray further based on a scattering, S-, matrix of the antenna. The S-matrix may, in some examples, comprise a stored initial S-matrix generated prior to the calibration being performed by the calibration unit. The initial S-matrix may be generated when manufacturing the antenna or when setting up the antenna the first time, or the initial S-matrix may relate to an S-matrix of a reference antenna. The initial S-matrix may be stored in the antenna itself and/or may be stored elsewhere and provided to the calibration unit as and when required for calibration of the subarrays with respect to each other.

In some examples, a said coupler decouples dual polarized radiator elements of the antenna, allowing for further improvements to the calibration based on the decoupling which flattens the frequency response of the subarray.

In some examples, the coupling signal comprises a mutual coupling signal.

In some examples, one or both of the first subarray and the second subarray comprise a corresponding, respective phase shifter element configured to adjust a phase with respect to a downtilt of the antenna.

BRIEF DESCRIPTION OF THE DRAWINGS

Further aspects, details and advantages of the present disclosure will become apparent from the detailed description of exemplary embodiments below and from the drawings, wherein:

FIGS. 13-16 show schematic illustrations of further dividers according to example implementations of the present disclosure;

DETAILED DESCRIPTION

In the following description, for purposes of explanation and not limitation, specific details are set forth in order to provide a thorough understanding of the present disclosure. It will be apparent to one of skill in the art that the present disclosure may be practiced in other embodiments that depart from these specific details.

The present disclosure generally relates to (mutual) coupling antenna calibration using special antenna feeding layouts. This may be implemented for antenna calibration in massive MIMO technology.

Figure 1:
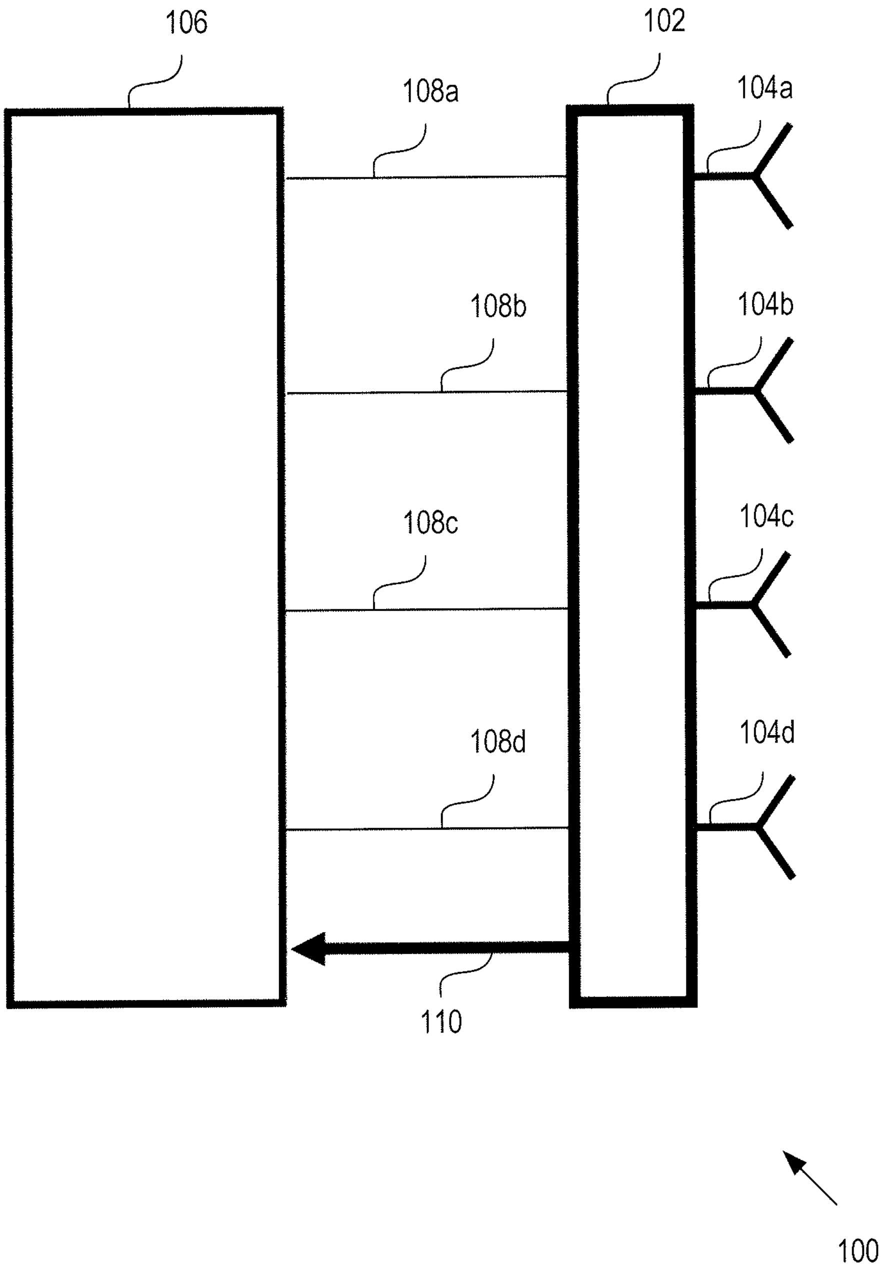
FIG. 1 (Prior art)
FIG. 1 is a system according to the prior art.
Figure 2:
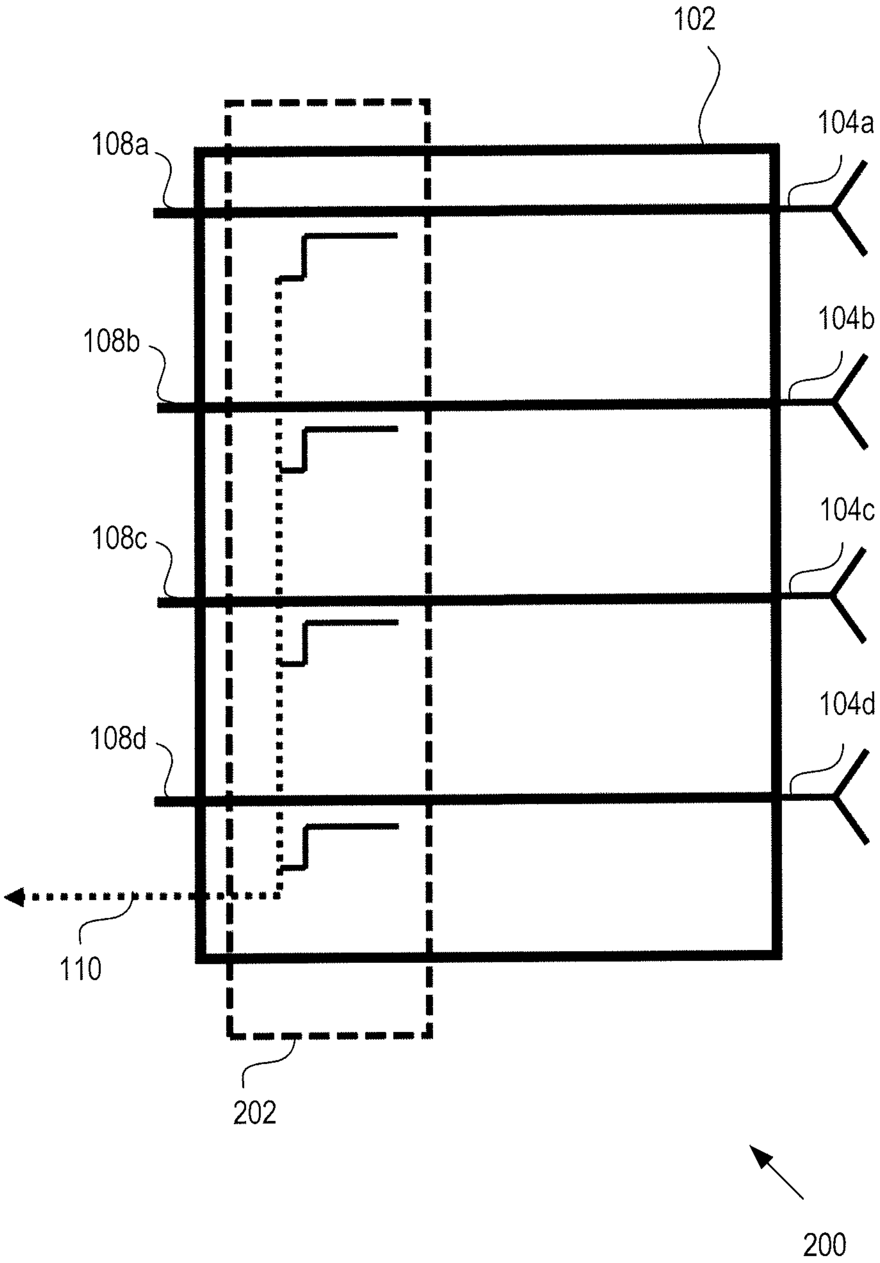
FIG. 2 (Prior art)
FIG. 2 is a further system according to the prior art.
Figure 3:
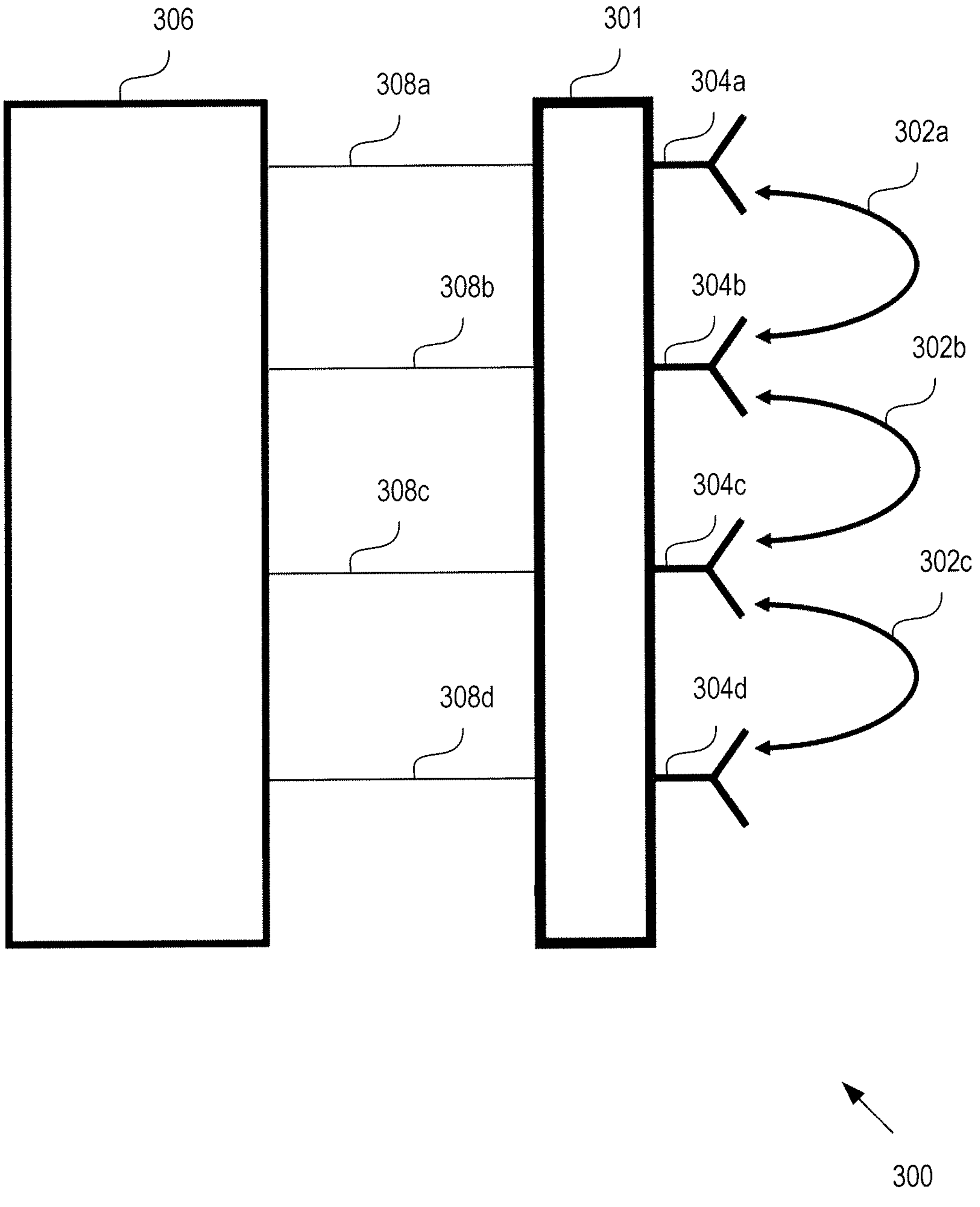
FIG. 3 is a system according to example implementations of the present disclosure.

FIG. 3 is a system 300 according to example implementations of the present disclosure, in which the calibration as described herein may be implemented.

In this example, the system 300 comprises an antenna 301, and dual polarized radiator elements 304*a-d*. A base station/radio unit 306 is coupled to the antenna 301 by respective branches 308*a-d*. A mutual coupling signal 302*a* is generated, in this example, between the dual polarized radiator elements 304*a* and 304*b*. A further mutual coupling signal 302*b* is generated, in this example, between the dual polarized radiator elements 304*b* and 304*c*. Furthermore, a mutual coupling signal 302*c* is generated, in this example, between the dual polarized radiator elements 304*c* and 304*d*.

Figure 4:
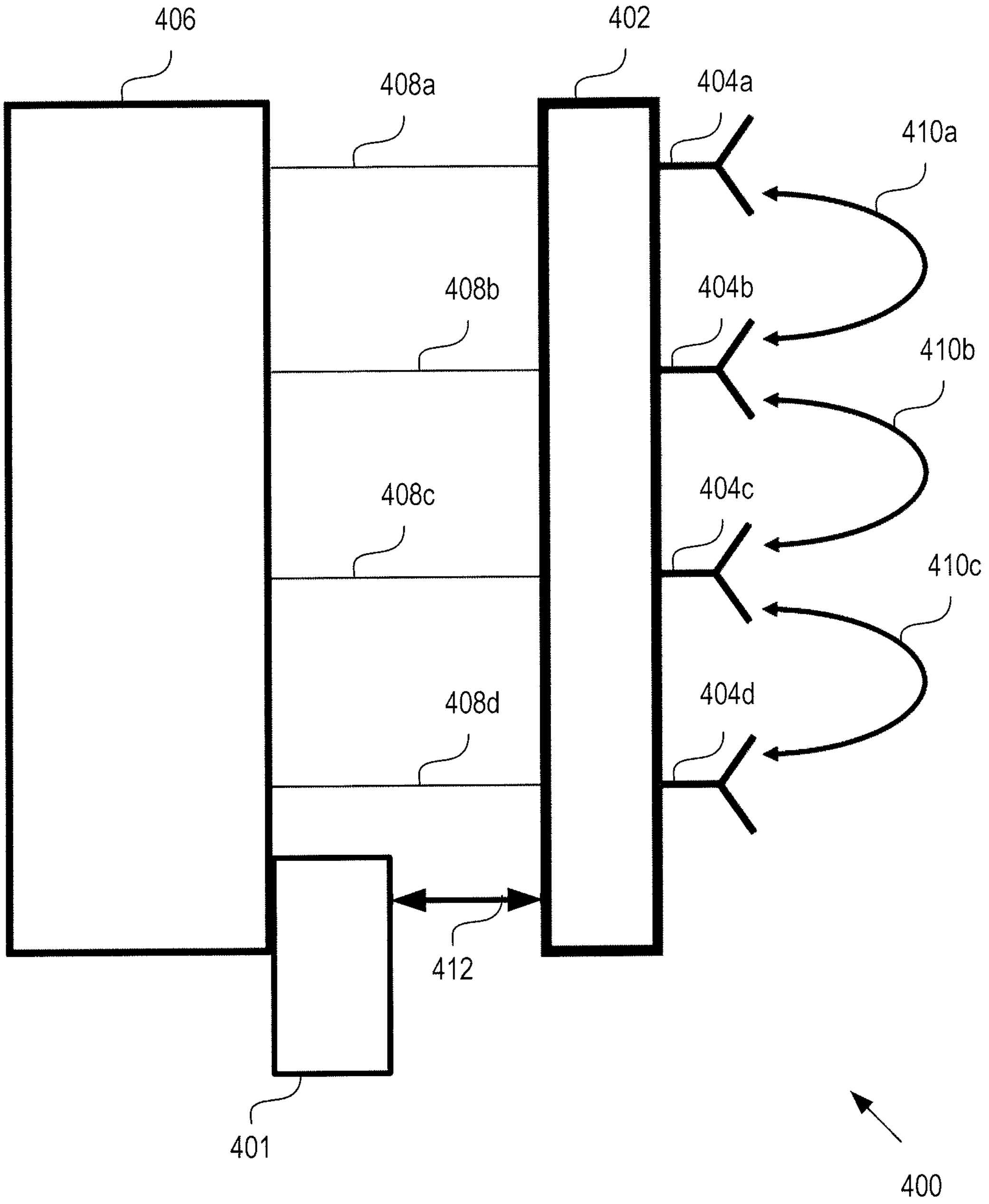
FIG. 4 is a further system according to example implementations of the present disclosure.

FIG. 4 shows a system 400 according to example implementations of the present disclosure. The system 400 may be based on system 300 outlined above.

In this example, the system 400 comprises a calibration unit 401, an antenna 402, and dual polarized radiator elements 404*a-d*. A base station/radio unit 406 is coupled to the antenna 402 by respective branches 408*a-d*. A mutual coupling signal 410*a* is generated, in this example, between the dual polarized radiator elements 404*a* and 404*b*. A further mutual coupling signal 410*b* is generated, in this example, between the dual polarized radiator elements 404*b* and 404*c*. Furthermore, a mutual coupling signal 410*c* is generated, in this example, between the dual polarized radiator elements 404*c* and 404*d*.

From the mutual coupling signals 410*a-c*, a calibration signal 412 may be generated and provided to the calibration unit 401 for calibration of the dual polarized radiator elements 404*a-d*. As will be appreciated, the calibration signal 412 may additionally or alternatively be generated by the calibration unit 401 itself. In some examples, signals generated from the base station may be used for calibration purposes.

Throughout the present disclosure, in some examples, the calibration unit 401 may be a logical unit, which may not be physically separated from the base station 406. The calibration unit 401 may hereby use the branches 408*a* to 408*d* for providing the calibration signal.

Signals, such as the calibration signal 412, may be sent between the base station 406 and the antenna 402 (in both directions) via the branches 408*a-d*.

The double-arrow in FIG. 4 indicates a logical direction of a signal, such as the calibration signal, which may be sent from the antenna 402 to the base station/radio unit 406 and/or the calibration unit 401, and vice versa, via the branches 408*a-d*.

When using this calibration algorithm, a special calibration routine may be used at the radio side/base station side. In order to detect and determine the mutual coupling signals in the base station, the following routine can be used (although other routines are possible):

The base station transmits, in this example, a signal at one signal branch, while all other signal branches do not transmit signals at this time, but start to detect incoming signals, e.g. by using an RF coupler and signal detector at the radio board or using their own receiver to detect the incoming signals (e.g. in a TDD system). For cost reasons, the radio unit may use already implemented equipment in the antenna, rather than a separate implementation. All these signal branches may detect an incoming signal amplitude and phase. This information is then, in this example, stored in a data memory of the base station/radio unit. When finished with this procedure, the transmitting signal branch stops transmitting signals and the next signal branch transmits a signal. All other branches again detect this signal and store the amplitude and phase information of the incoming signal in the data memory. This algorithm will be done at all signal branches. As a result, at the end of this algorithm, all amplitude and phase information is analyzed and stored in the data memory. To get the correct phase information of all signal branches, the data may, in some examples, need to be analyzed in a data post-processing algorithm. Here, a phase-data matrix may need to be solved. For solving this phase-data matrix, the S-matrix of the antenna may need to be known. This S-matrix can be measured and stored in the production line of the antenna. At the end of the phase-data calculation(s), all phase information is known, and the base station/radio-unit can use this to adapt the phase of the signal branches to perform beam forming in a massive MIMO network accurately.

FIGS. 5*a-d* shows a calibration procedure according to example implementations of the present disclosure. These figures show how the base station may work with the mutual coupling signals and how the branch-phase values may be calculated. This algorithm is an example, while different algorithms can also be used. For example, algorithms, were one does not have to mute all signal branches for calibration, but can calibrate only with some branches and have mobile service on all the other branches is possible. Signals, such as the calibration signal, may be sent between the base station 406 and the antenna 402 (in both directions) via the branches 408*a-d*. The arrow indicates a logical direction of a signal, such as the calibration signal, which may be sent via the branches 408*a-d*.

Figure 5A:
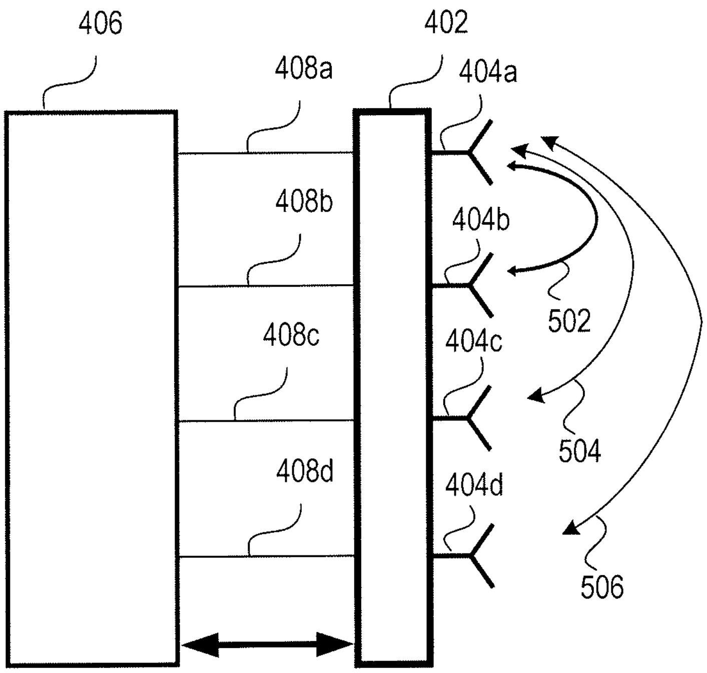
FIGS. 5*a-d* shows a calibration procedure according to example implementations of the present disclosure.

In FIG. 5*a*, the dual polarized radiator element 404*a* transmits a signal while the other dual polarized radiator elements are muted.

A first measurement for the mutual coupling signal 502 is taken based on the phase of a signal for dual polarized radiator element 404*a*, a phase of a signal for dual polarized radiator element 404*b*, taking into account a potential first offset between these radiator elements.

A second measurement for the mutual coupling signal 504 is taken based on the phase of the signal for dual polarized radiator element 404*a*, a phase of a signal for dual polarized radiator element 404*c*, taking into account a potential second offset between these radiator elements.

A third measurement for the mutual coupling signal 506 is taken based on the phase of the signal for dual polarized radiator element 404*a*, a phase of a signal for dual polarized radiator element 404*d*, taking into account a potential third offset between these radiator elements.

Figure 5B:
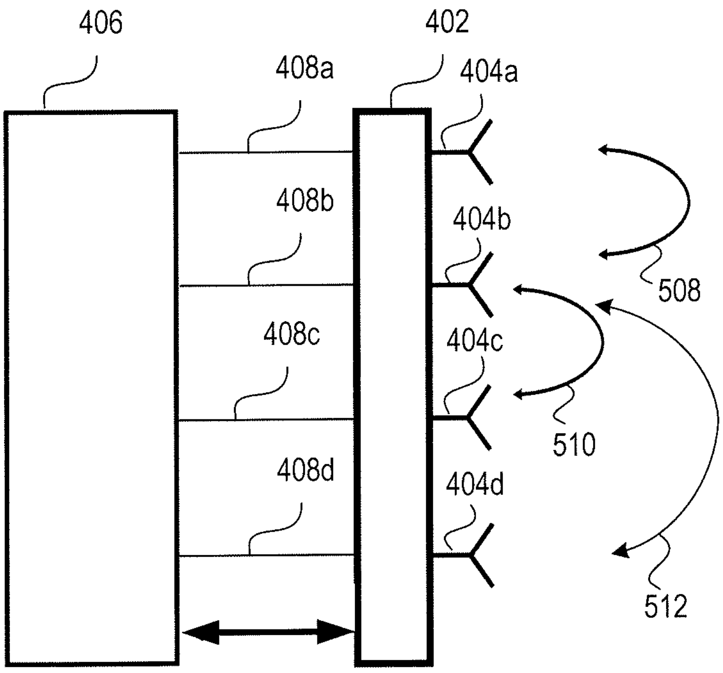

In FIG. 5*b*, the dual polarized radiator element 404*b* transmits a signal while the other dual polarized radiator elements are muted.

A fourth measurement for the mutual coupling signal 508 is taken based on the phase of a signal for dual polarized radiator element 404*b*, a phase of a signal for dual polarized radiator element 404*a*, taking into account a potential fourth offset between these radiator elements.

A fifth measurement for the mutual coupling signal 510 is taken based on the phase of the signal for dual polarized radiator element 404*b*, a phase of a signal for dual polarized radiator element 404*c*, taking into account a potential fifth offset between these radiator elements.

A sixth measurement for the mutual coupling signal 512 is taken based on the phase of the signal for dual polarized radiator element 404*b*, a phase of a signal for dual polarized radiator element 404*d*, taking into account a potential sixth offset between these radiator elements.

Figure 5C:
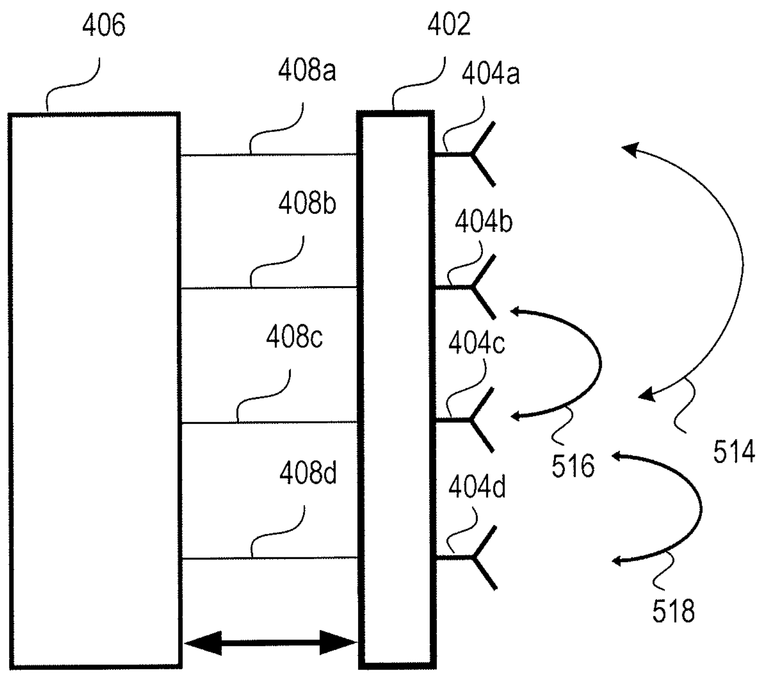

In FIG. 5*c*, the dual polarized radiator element 404*c* transmits a signal while the other dual polarized radiator elements are muted.

A seventh measurement for the mutual coupling signal 514 is taken based on the phase of a signal for dual polarized radiator element 404*c*, a phase of a signal for dual polarized radiator element 404*a*, taking into account a potential seventh offset between these radiator elements.

An eighth measurement for the mutual coupling signal 516 is taken based on the phase of the signal for dual polarized radiator element 404*c*, a phase of a signal for dual polarized radiator element 404*b*, taking into account a potential eighth offset between these radiator elements.

A ninth measurement for the mutual coupling signal 518 is taken based on the phase of the signal for dual polarized radiator element 404*c*, a phase of a signal for dual polarized radiator element 404*d*, taking into account a potential ninth offset between these radiator elements.

Figure 5D:
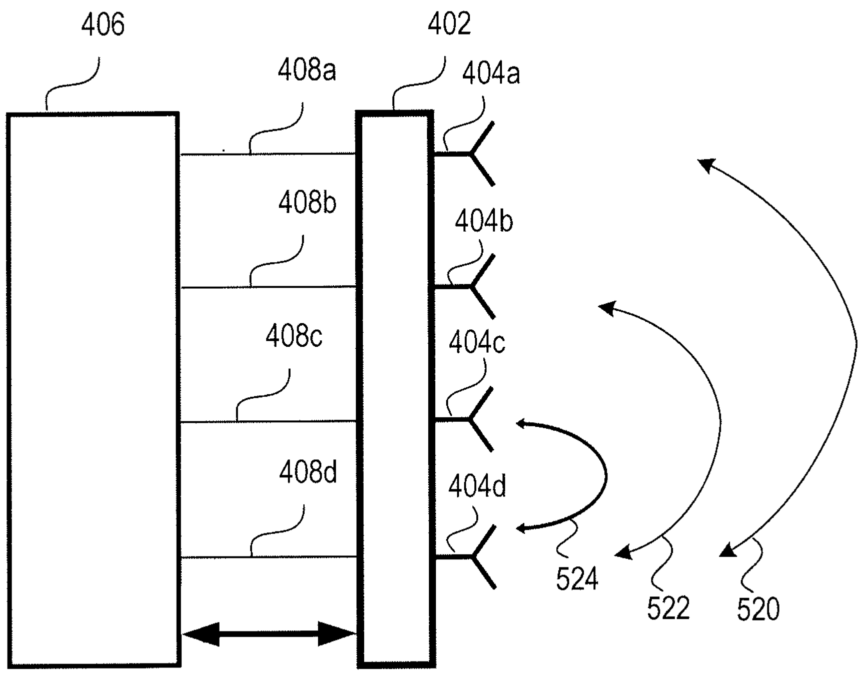

In FIG. 5*d*, the dual polarized radiator element 404*d* transmits a signal while the other dual polarized radiator elements are muted.

A tenth measurement for the mutual coupling signal 520 is taken based on the phase of a signal for dual polarized radiator element 404*d*, a phase of a signal for dual polarized radiator element 404*a*, taking into account a potential tenth offset between these radiator elements.

An eleventh measurement for the mutual coupling signal 522 is taken based on the phase of the signal for dual polarized radiator element 404*d*, a phase of a signal for dual polarized radiator element 404*b*, taking into account a potential eleventh offset between these radiator elements.

A twelfth measurement for the mutual coupling signal 524 is taken based on the phase of the signal for dual polarized radiator element 404*d*, a phase of a signal for dual polarized radiator element 404*c*, taking into account a potential twelfth offset between these radiator elements.

The algorithm of calculation of the phase information can vary. There are different methods to measure and determine the correct phase information. In principle, all these methods have the same problem. The problem for calibration using mutual coupling is the strong frequency dependency of the mutual coupling signals. Especially for broadband antennas, mutual coupling signals show a resonant behavior at various frequencies. This resonant behavior reduces strongly the accuracy of mutual coupling calibration algorithms. For a mutual coupling algorithm, a flat frequency response is optimal/preferred.

Figure 6A:
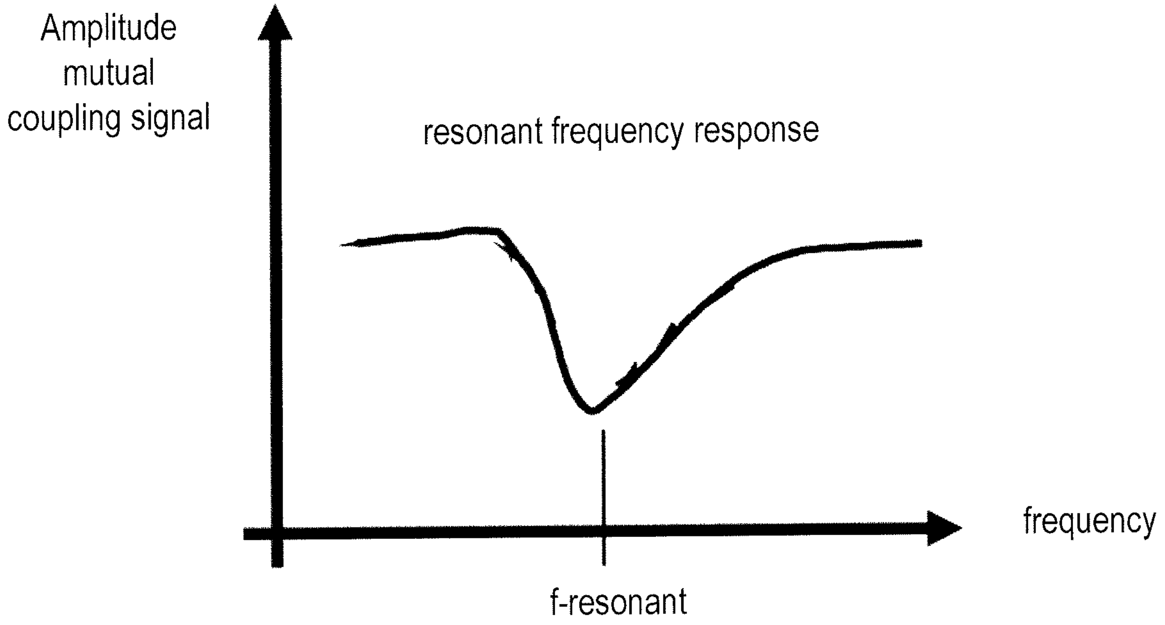
FIGS. 6*a* and *b* shows amplitude mutual coupling signal versus frequency using different dividers.

FIG. 6*a* shows amplitude mutual coupling signal versus frequency for a coupling signal in an antenna in which T-combiners are implemented. As can be seen, a strong resonant frequency response is detected.

Figure 6B:
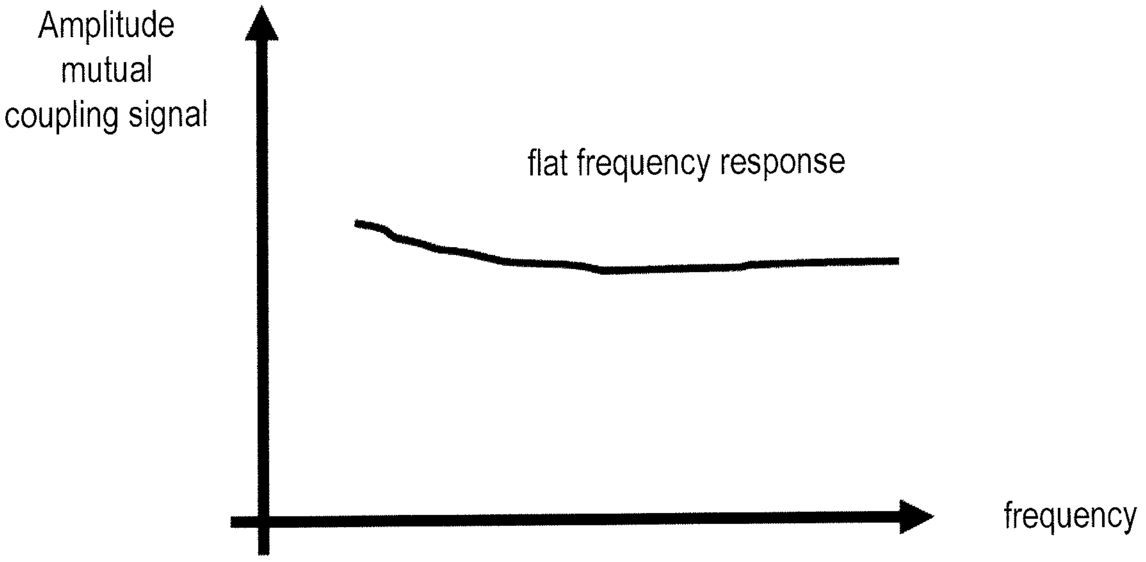

FIG. 6*b* shows amplitude mutual coupling signal versus frequency for a coupling signal in an antenna in which a coupler is implemented which is configured to flatten the frequency response of the coupling signal.

In an antenna, there may be different reasons for the frequency response of the mutual coupling signals. These include one or more of a distance of the dipoles from each other, antenna feeding network, dipole separation/side walls, dipoles and radome and distance of radome to the dipoles. All these parameters may affect the frequency response of these mutual coupling signals.

Using a special feeding network for the antenna elements may change the frequency response of these mutual coupling signals dramatically.

Figure 7:
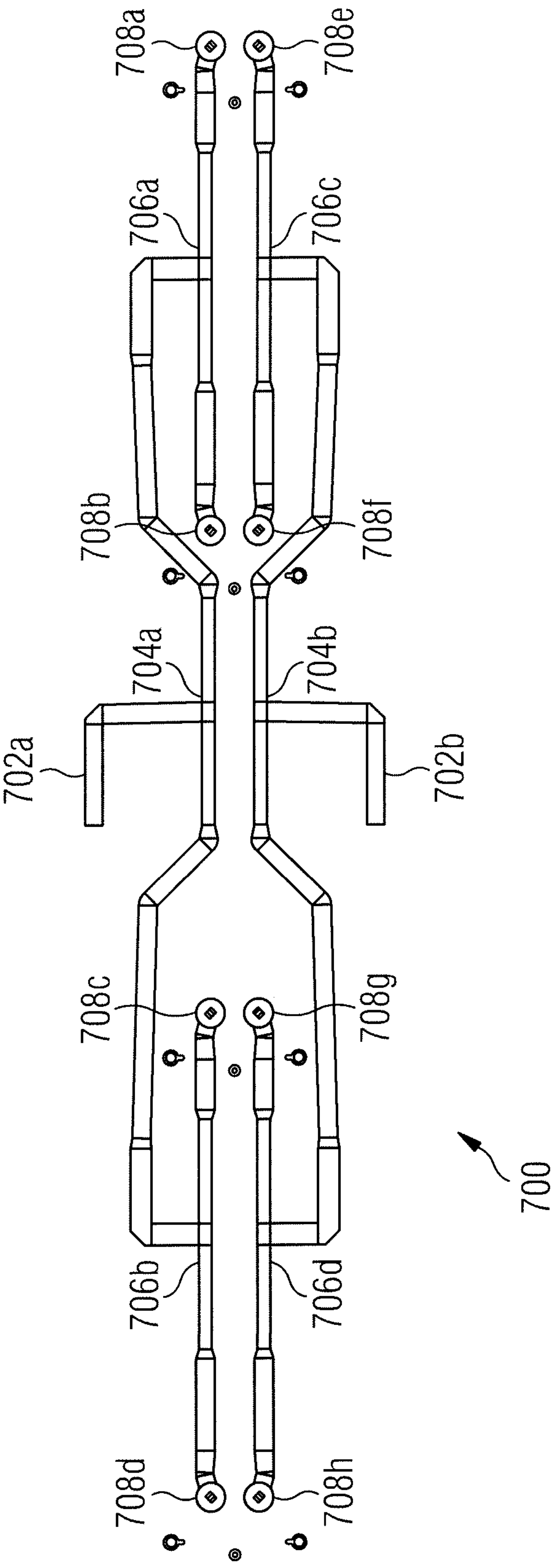
FIG. 7 shows a top-view of a schematic illustration of a divider network.

FIG. 7 shows a top-view of a schematic illustration of a divider network 700 according to the state of the art.

In this example, an antenna feeding layout with low-loss T-combiners/splitters is used.

In this example, the divider network 700 comprises antenna array inputs 702*a* and 702*b*. A four element antenna array layout is fed by first T-splitters, splitting the input signals by the T-splitters 704*a* and 704*b* first in two, then again with the second stage splitters 706a/b and 706c/d in four. The signal is then connected to the dipole pins via dipole connections 708a-h.

The two parts of the divider network may be used for providing signals with different polarizations to the dual polarized radiator elements.

Figure 8:
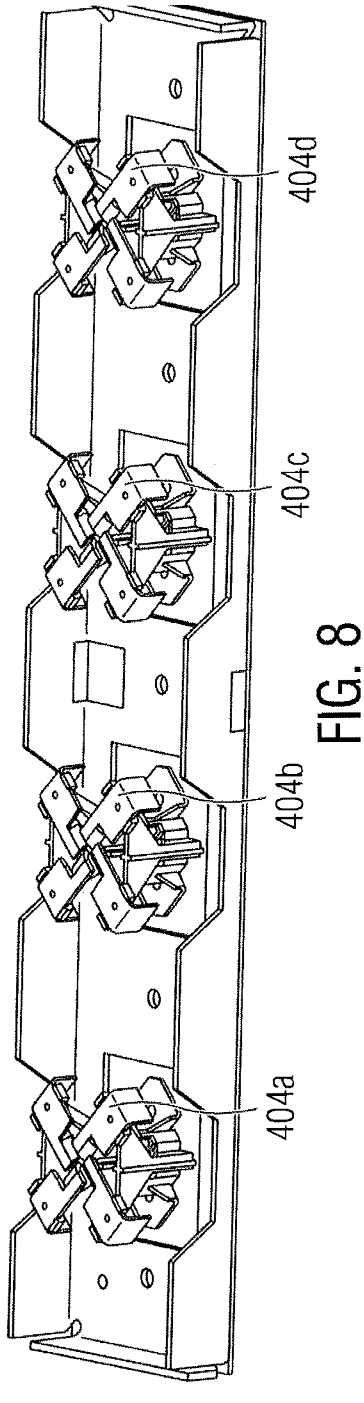
FIG. 8 shows a perspective view of a schematic illustration of a subarray.
Figure 9:
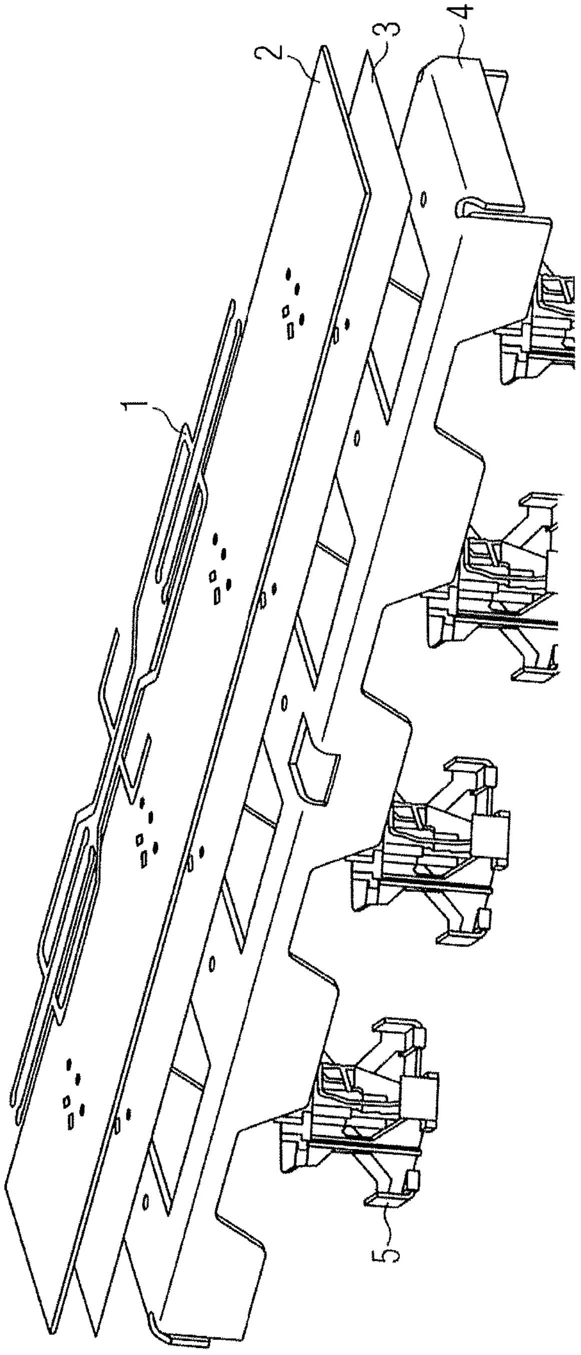
FIG. 9 shows an exploded perspective view of a schematic illustration of parts of an antenna.

FIG. 8 shows a perspective view of a schematic illustration of a subarray of dual polarized radiator elements according to the state of the art. FIG. 9 shows an exploded perspective view of a schematic illustration of corresponding parts of the antenna.

A top-layer feeding network microstrip (1) is provided on an antenna printed circuit board (2). A ground layer printed circuit board (3) is arranged between the antenna printed circuit board (2) and the antenna reflector (4). The radiator dipoles (5) are arranged on the antenna reflector (4).

These T-splitters are easy to manufacture and design, so they are used very often in antenna design. However, drawbacks arise due to the resonances in the frequency response using T-splitters in the antenna.

Figure 10:
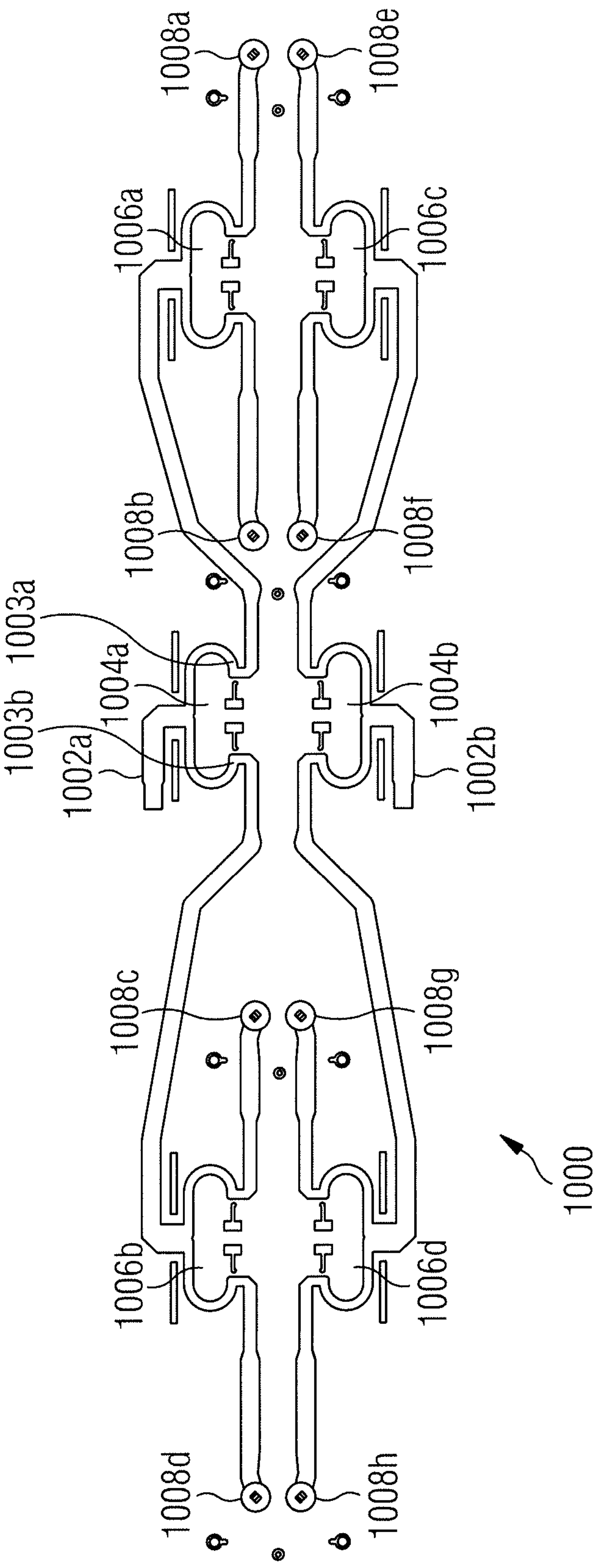
FIG. 10 shows a top-view of a schematic illustration of a divider network according to example implementations of the present disclosure.

FIG. 10 shows a top-view of a schematic illustration of a divider network 1000 (which may also be called feeding network) according to example implementations of the present disclosure.

In this example, the feeding network uses Wilkinson power dividers. These special power dividers use a resistor between the two outputs of this power dividers. This resistor will terminate signals at the output, that are out of phase to each other. This termination will suppress reflected signals from the dipoles and so improves antenna input return loss and cross-influences between the dipole elements.

It is to be noted that any references to a Wilkinson power divider equally refers to a Wilkinson combiner or Wilkinson divider or Wilkinson splitter, and any references to a divider may be replaced with the wording combiner or splitter or vice versa.

In this example, the divider network 1000 comprises antenna array inputs 1002a and 1002b. The Wilkinson power dividers have decoupled outputs 1003a and 1003b (indicated in FIG. 10 only for one of the Wilkinson power dividers).

A four element antenna array layout is fed by first Wilkinson power dividers, splitting the input signals by the Wilkinson power dividers 1004a and 1004b first in two, then again with the second stage Wilkinson power dividers 1006a/b and 1006c/d in four. The signal is then connected to the dipole pins via dipole connections 1008a-h.

The divider network 1000 allows for two signals being provided to the dipoles. These signals may have, in some examples, different polarizations with respect to each other.

Figure 11:
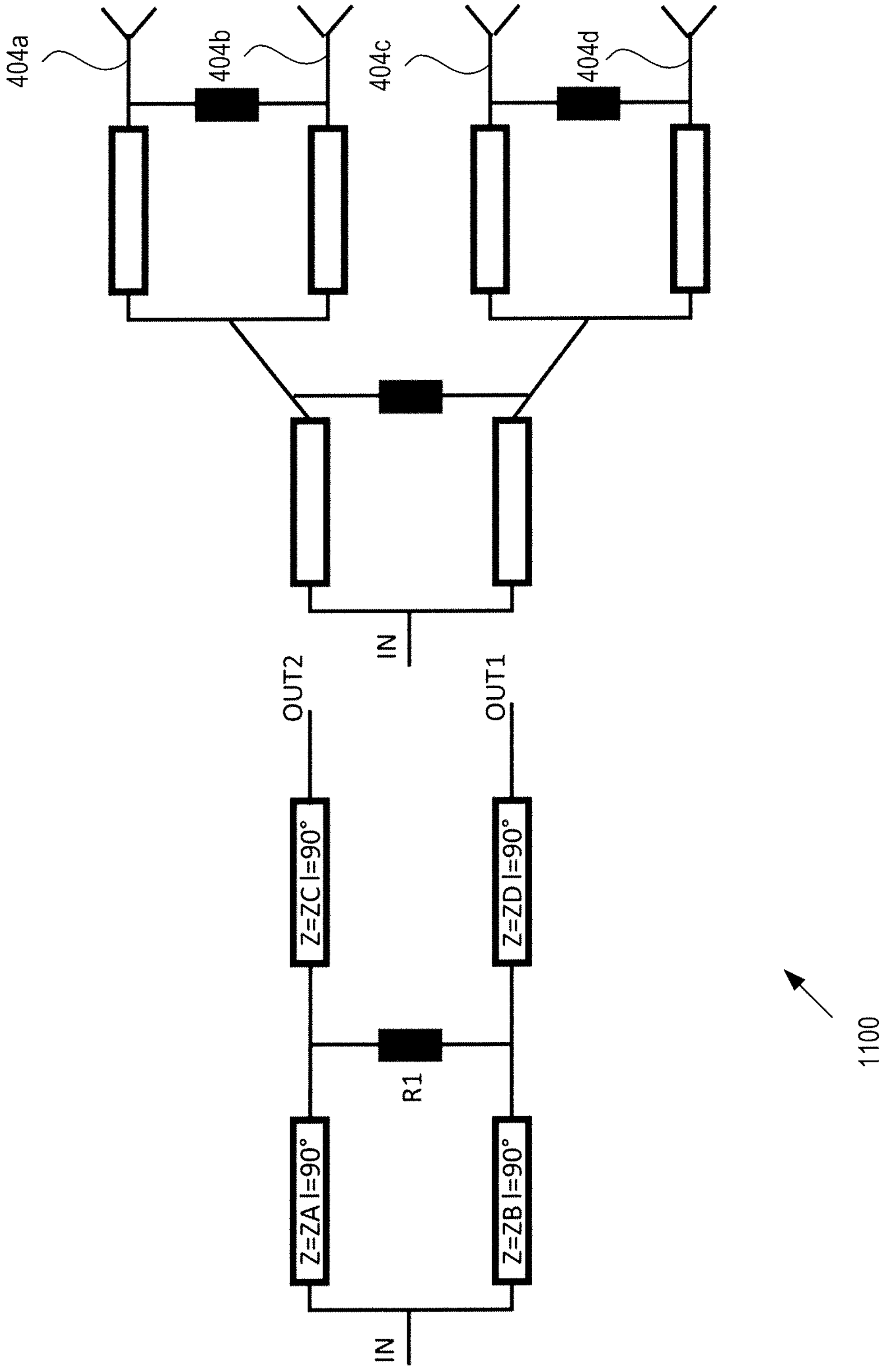
FIG. 11 shows a schematic illustration of a further divider according to example implementations of the present disclosure.

FIG. 11 shows a schematic illustration of a Wilkinson divider network 1100 according to FIG. 10. On the left side, the schematic for a Wilkinson combiner is shown and on the right side, the schematic for a 4-element antenna sub-array is shown.

Comparing the mutual coupling signals of these two antennae feeding networks (Wilkinson feeding network vs. T-splitter network), one will detect a strong improvement in the frequency response of mutual coupling signals when using splitters with decoupled outputs, such as, for example, a Wilkinson splitter. The outputs of these splitters are decoupled, in some examples, by about −20 dB. Building a feeding network with such (Wilkinson) splitters shows an advantage in contrast to using T-splitters.

Figure 12:
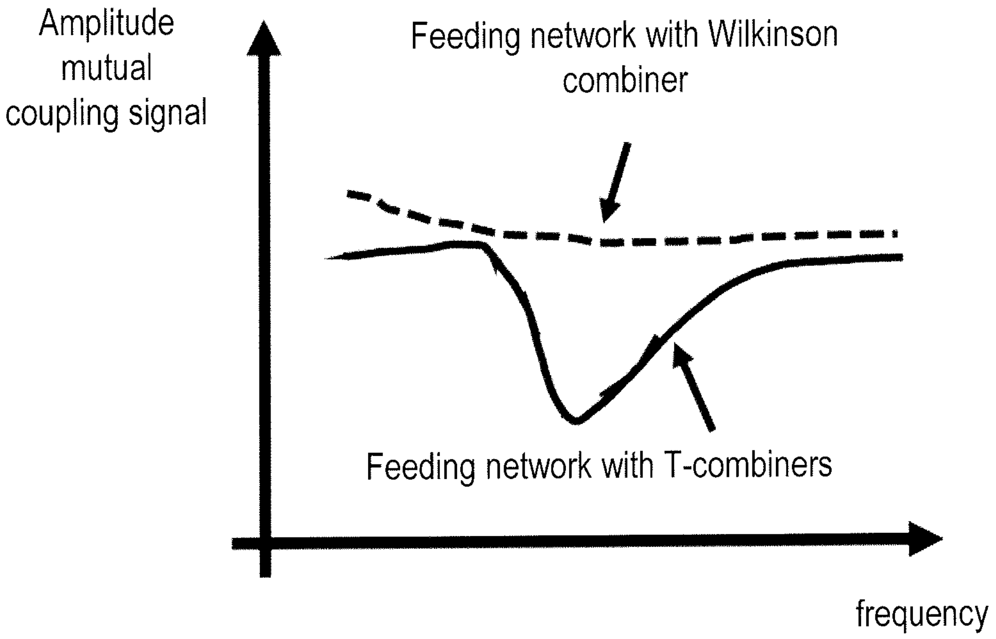
FIG. 12 shows amplitude mutual coupling signal versus frequency for different dividers.

FIG. 12 shows amplitude mutual coupling signal versus frequency for different dividers (lower curve with frequency resonance for T-splitter and upper flat curve for Wilkinson power divider).

The frequency response is 'flat' for the Wilkinson power divider network, showing no resonant behavior, whereby this resonant behavior may negatively affect accuracy of mutual coupling calibration.

Mutual coupling calibration works dramatically better when using a Wilkinson combiner antenna feeding network, instead of using a T-combiner antenna feeding network.

Having a flat frequency response for the mutual coupling signals improves mutual coupling calibration algorithms and assures higher calibration accuracy and thus better network quality.

Figure 13:
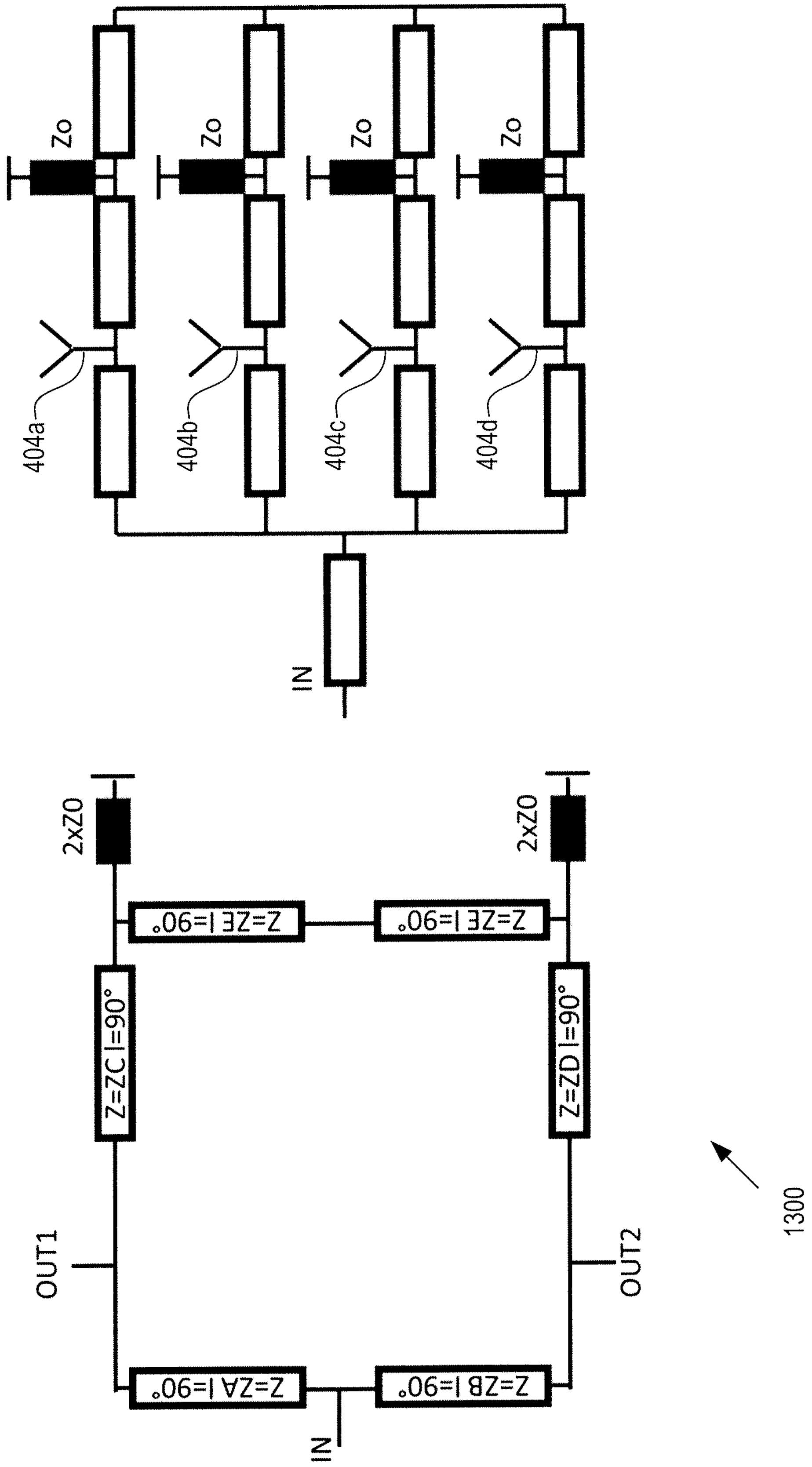

A Wilkinson splitter is one example of a splitter with decoupled/isolated outputs. There are other splitters with decoupled outputs which may be used. For example, a branch line coupler, a rat-race coupler, a Gysel combiner, a Kouzoujian combiner etc. All these splitters can be used in such an antenna feeding network. They all show a flat frequency response of the mutual coupling signals and therefore an advantage compared to T-splitters. In this document, any references to Wilkinson splitters may be replaced with any of the above-mentioned other splitters which provide for flat frequency responses FIG. 13 shows a schematic illustration of a Gysel combiner network 1300 according to example implementations of the present disclosure.

For this combiner, the outputs are isolated from each other. Using for example an unequal split Gysel combiner (i.e. one with different impedances) can be useful to reach an amplitude aperture for an antenna array. FIG. 13 depicts a schematic for such an unequal split Gysel combiner. Using a 4-way Gysel combiner, a 4-element antenna-sub-array design is also shown on the right hand side of FIG. 13.

Figure 14:
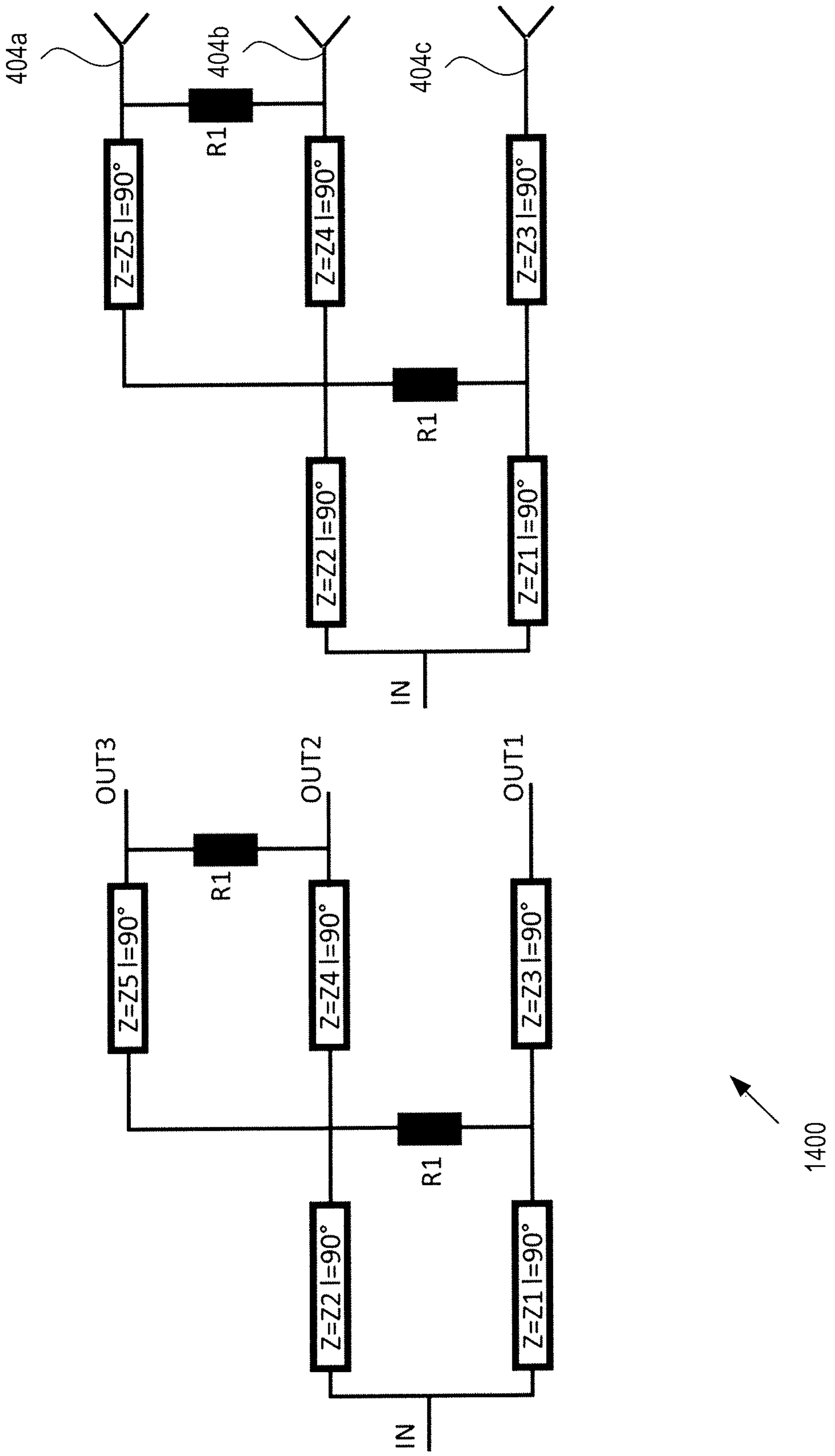

FIG. 14 shows a schematic illustration of a Kouzoujian combiner network 1400 according to example implementations of the present disclosure.

The Kouzounjian splitter can be used like the Wilkinson combiner. In addition, for this combiner, an equal and unequal split design can be used. Using for example an unequal split Kouzounjian splitter (i.e. one with different impedances) can be useful to reach an amplitude aperture for an antenna array. A 3-element antenna sub-array is shown on the right hand side of FIG. 14.

FIG. 15 shows a schematic illustration of a rat race combiner network 1500 according to example implementations of the present disclosure.

The Branch-line combiner can be used. Furthermore, for this combiner, the outputs are isolated from each other. Using for example an unequal split Branch-line combiner (i.e. one with different impedances) can be useful to reach an amplitude aperture for an antenna array. In FIG. 15, the schematic for an unequal split Branch-line is shown on the left hand side. Using a 4-way Branch-line combiner network, a 4-element antenna-sub-array design is shown on the right hand side of FIG. 15.

Figure 16:
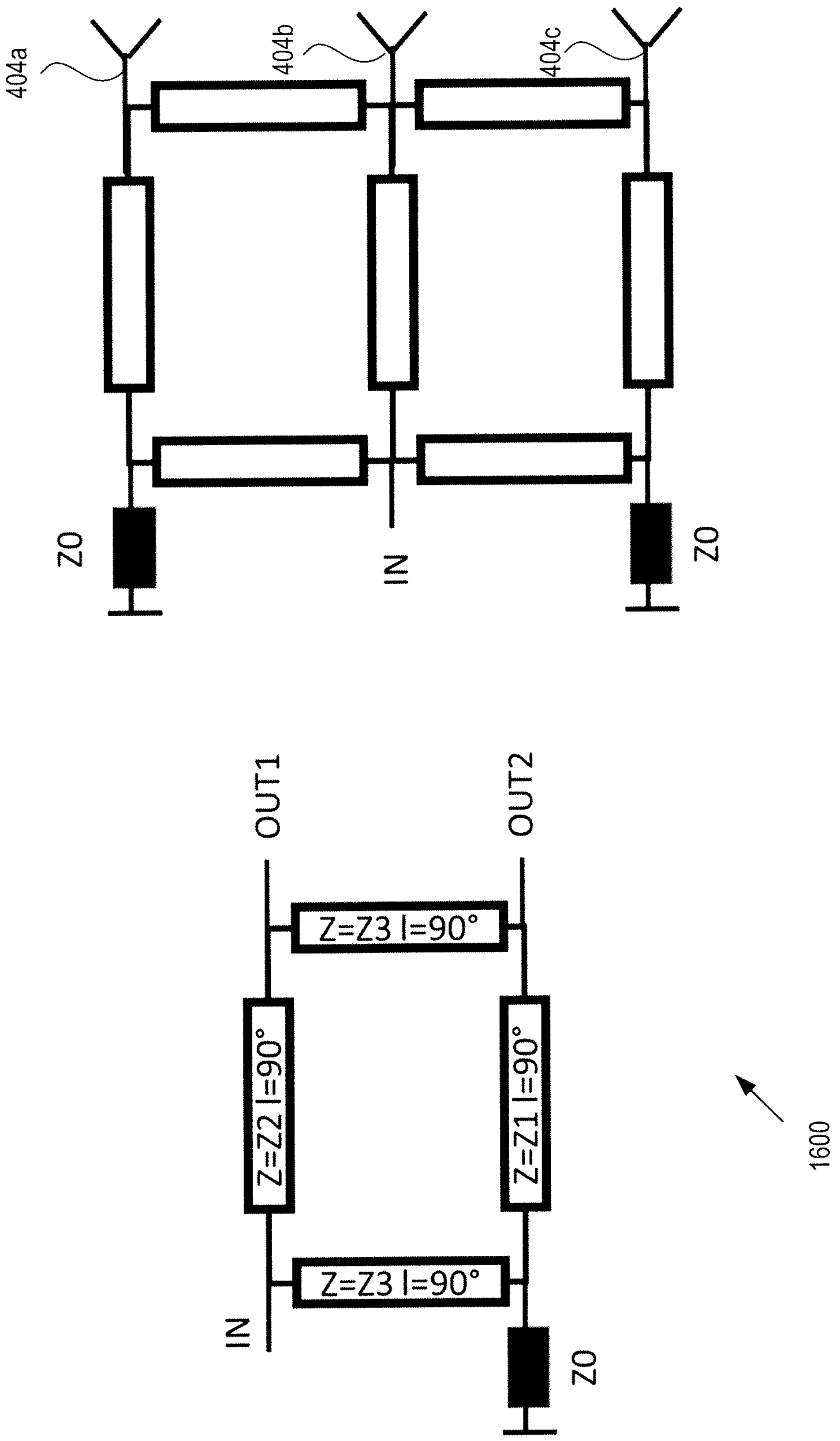

FIG. 16 shows a schematic illustration of a Branch line coupler network 1600 according to example implementations of the present disclosure.

The Branch-line coupler/splitter can be used like the Wilkinson combiner. Furthermore, for this combiner, an equal and unequal split (with advantages outlined above for the other splitters based on using different impedances) design can be used. A 3-element antenna sub-array is shown on the right hand side of FIG. 16.

Figure 17:
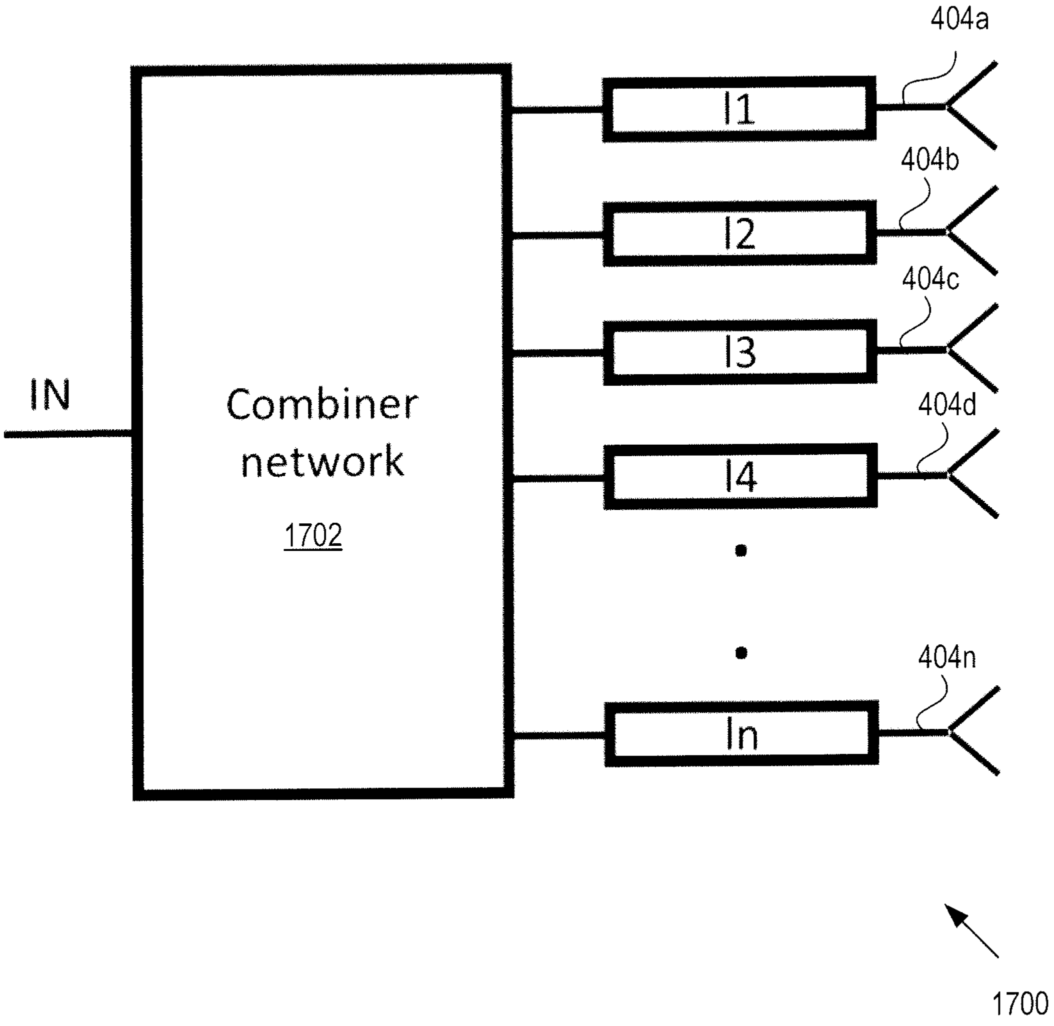
FIG. 17 shows a schematic illustration of a network according to example implementations of the present disclosure.

FIG. 17 shows a schematic illustration of a network 1700 according to example implementations of the present disclosure. Such a network 1700 may be implemented in a phase aperture antenna.

In this example, the network 1700 comprises a combiner network 1702 which is coupled to the dual polarized radiator elements 404*a-n* by corresponding respective signal lines I1-In.

For aligning the phase aperture of the antenna at the output of the combiner matrix, signal lines I1-In are added to adapt the correct phase length for each dipole. For isolating combiners, these signal lines may not affect or produce resonances in the mutual coupling components. For the non-isolating T-splitters, these lines would affect the resonance behavior dramatically.

Figure 18A:
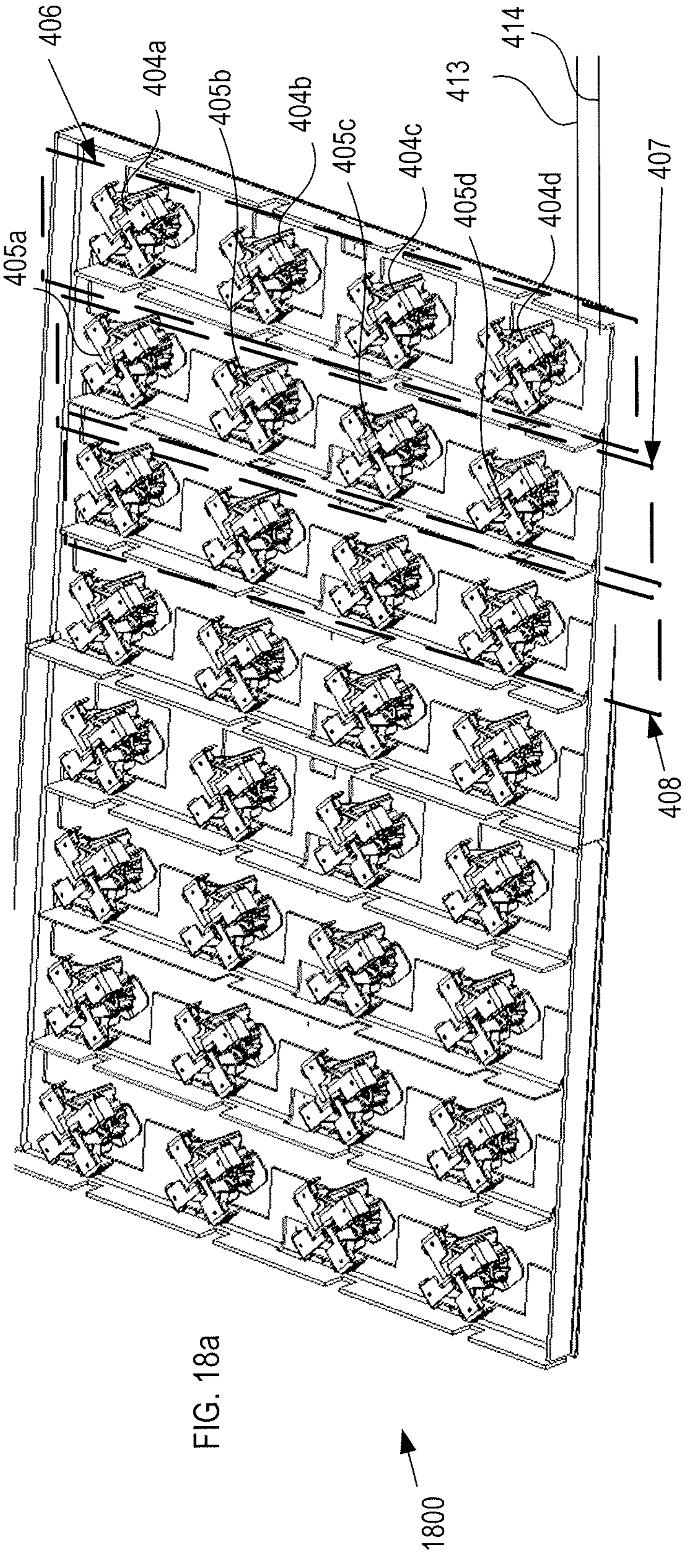
FIGS. 18*a* and *b* show schematic illustrations of an antenna according to example implementations of the present disclosure.

FIGS. 18*a* and *b* show schematic illustrations of an antenna according to example implementations of the present disclosure.

A typical massive MIMO antenna array is shown in a matrix 1800 with, in this example, eight columns and four antenna sub-array-elements. Some of the subarrays are highlighted with dashed lines (for subarrays 406, 407 and 408). Some of the dual polarized radiator elements 404*a-d* and 405*a-d* are indicated.

The array has, in this example, 16 input ports. For each column, there are two inputs 413/414, since the dipole elements radiate the signals two times in two different polarizations. In this example, one time for polarization +45° and one time for polarization −45°.

As will be appreciated, other antenna array containing, e.g., two, three, five etc. antenna elements in one sub-array or different numbers of columns may be implemented.

Figure 18B:
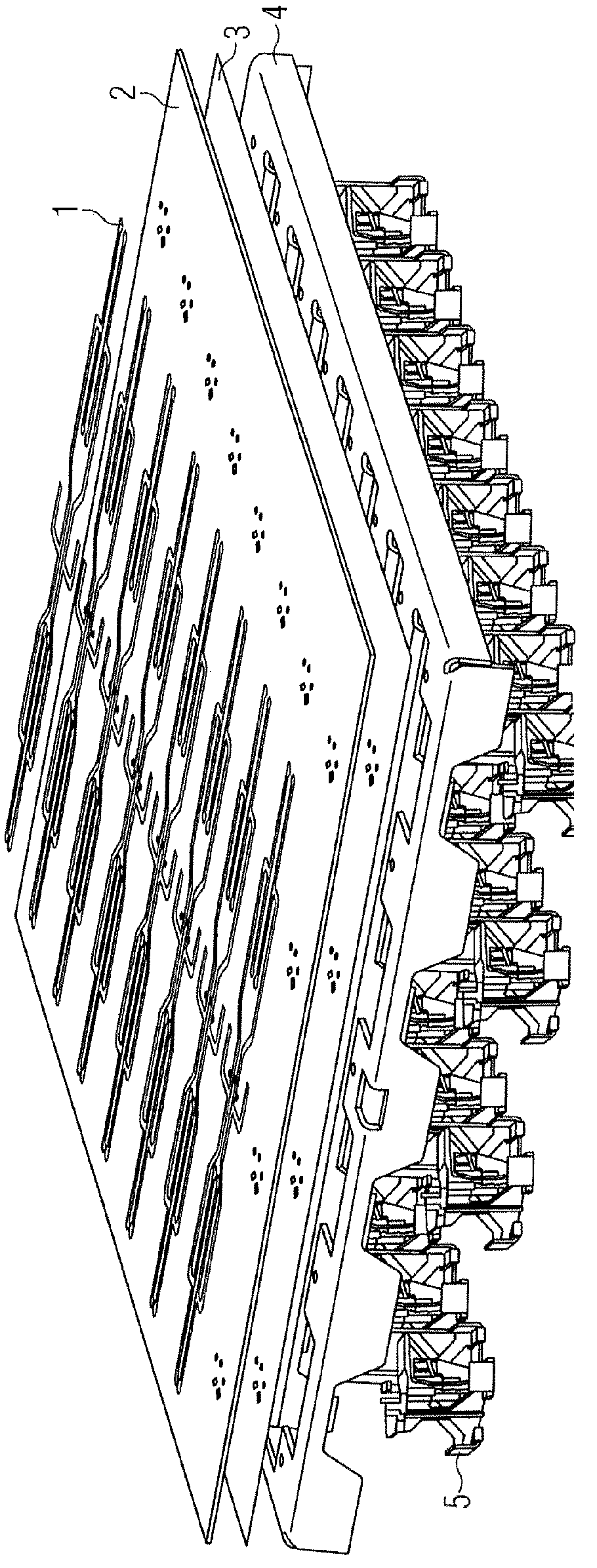

In FIG. 18*b*, the microstrip feeding layout (1) is arranged on a printed circuit board (2). In this example, a ground copper layer (3) is provided between the dipoles (4) and the printed circuit board (2). The dipoles (4) are arranged on a reflector (5).

For designs using T-combiner antenna feeding networks according to the state of the art, the frequency response of the different mutual coupling signal show a strong resonant behavior.

Figure 19:
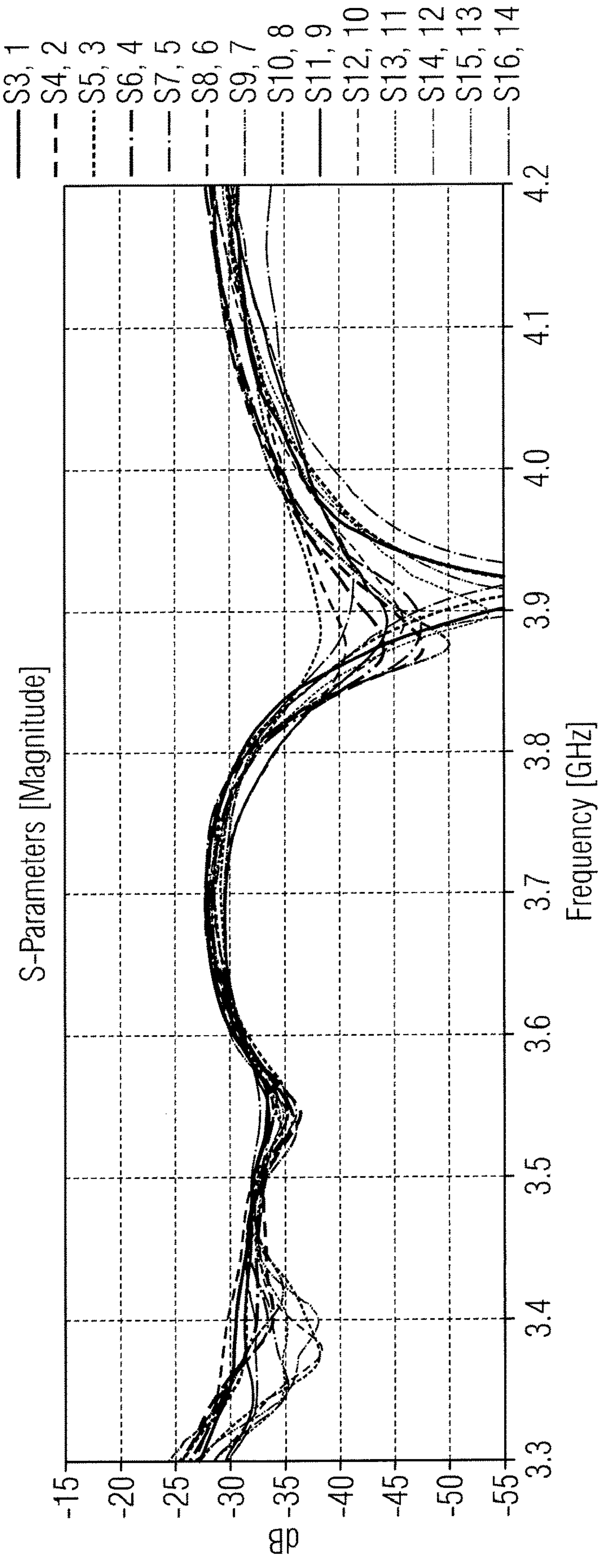
FIGS. 19-22 show S-parameters versus frequency for different divider networks.

In FIG. 19, which shows S-parameters versus frequency in a network using T-combiners (in a network as shown in FIG. 7), one can see the mutual coupling from one column to the neighboring column all with corresponding polarization. For this 16-port antenna, there are 14 of these signals, that is seven for polarization 0 and seven for polarization 1.

Figure 20:
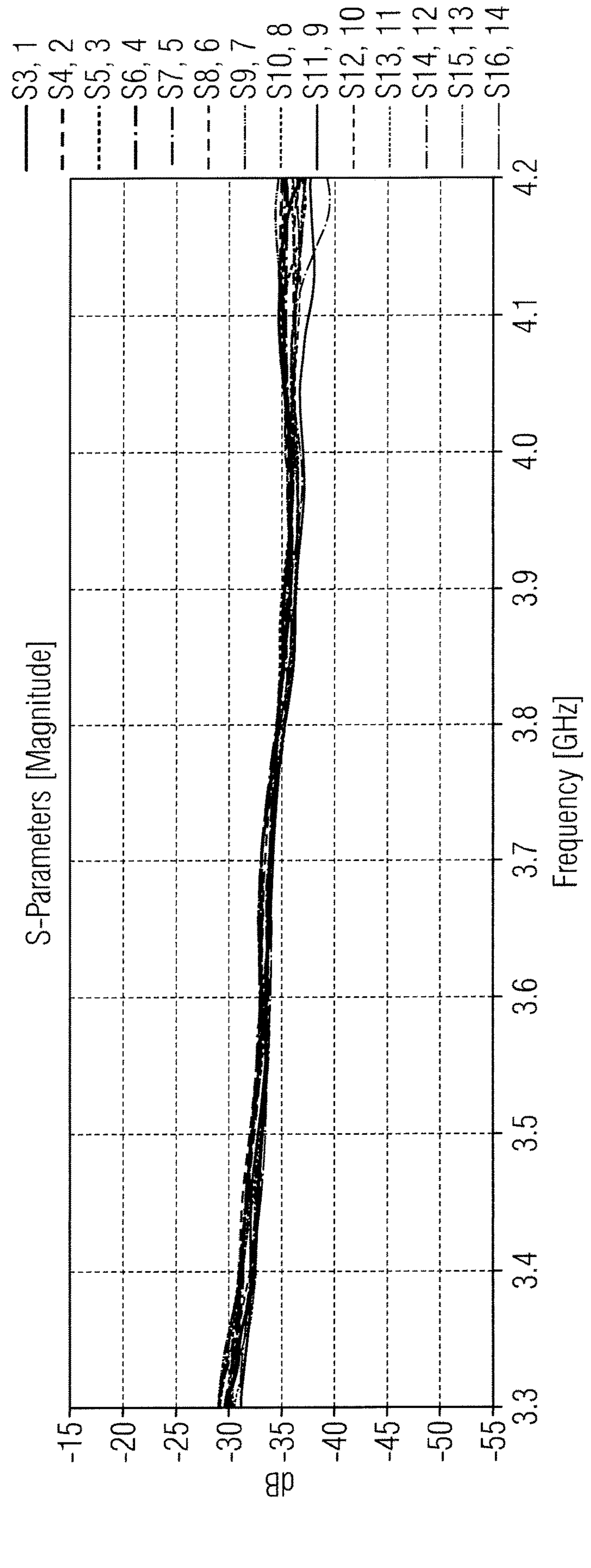

In FIG. 20, which shows S-parameters versus frequency in a network using Wilkinson combiners (in a network as shown in FIG. 10), the resonant behavior is significantly reduced. The column-to-neighboring-column (same polarization) coupling is plotted in FIG. 20 for this antenna using a Wilkinson feeding network. In the full bandwidth, the coupling signals show no resonances. In this four-element antenna array, three Wilkinson combiners are used for each antenna sub-array. The Wilkinson combiner in the middle splits the signal in two for the two antenna elements at the top of the array and for the two elements at the bottom of the array. The other two Wilkinson combiners split the signal again in two.

Figure 21:
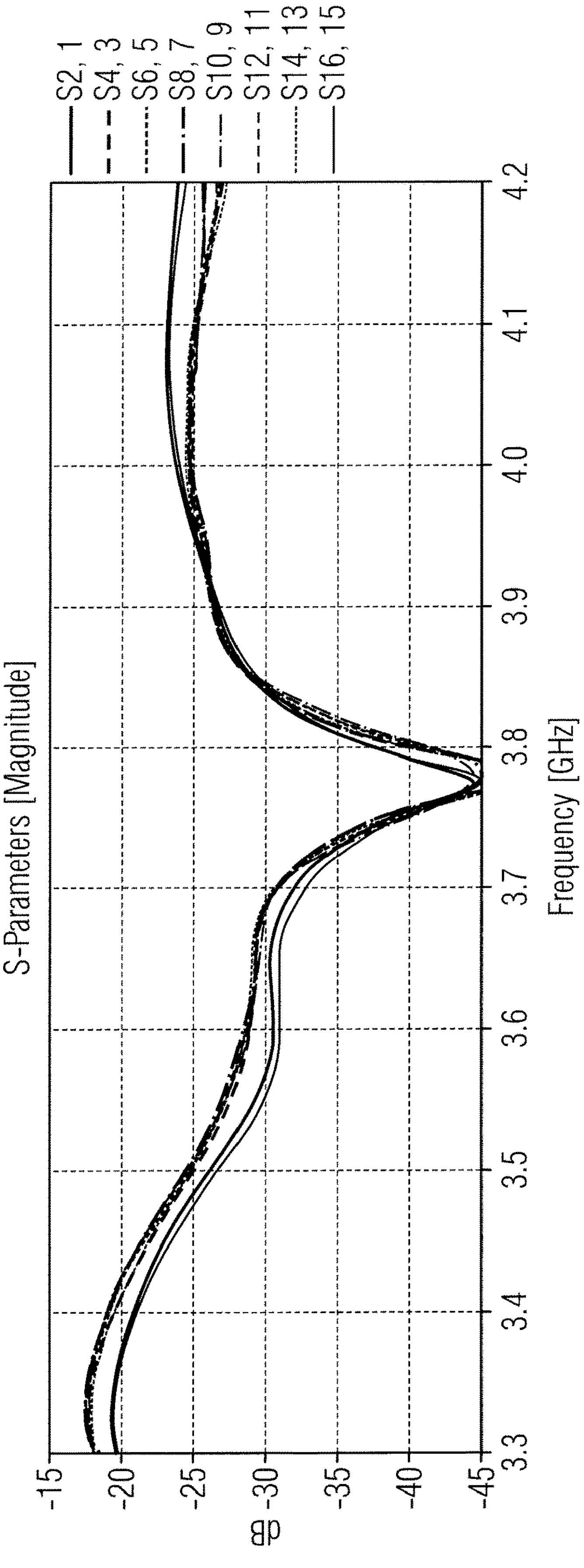
Figure 22:
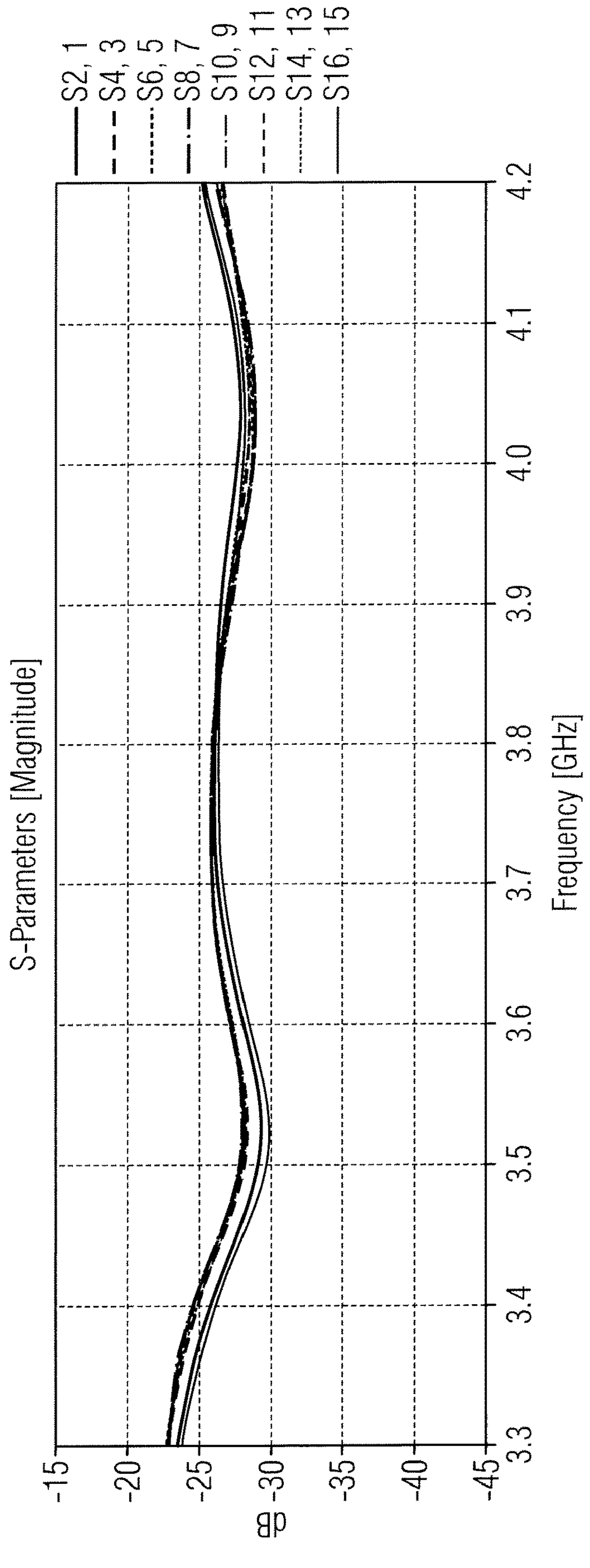

Having a look at the coupling signals from polarization +45° to −45° in the same column, one will see a similar behavior. FIG. 21 shows the frequency response for a T-combiner feeding network. Here, eight coupling signals are plotted for this 8-column antenna array. In FIG. 22, the frequency response is shown of this antenna using a Wilkinson combiner network. A significant improvement can be observed compared to T-combiner networks. For the Wilkinson layout, the frequency response is much smoother and shows only slight resonances, in this example, at 3500 and 4050 MHz, making it ideal for mutual coupling calibration.

Figure 23A:
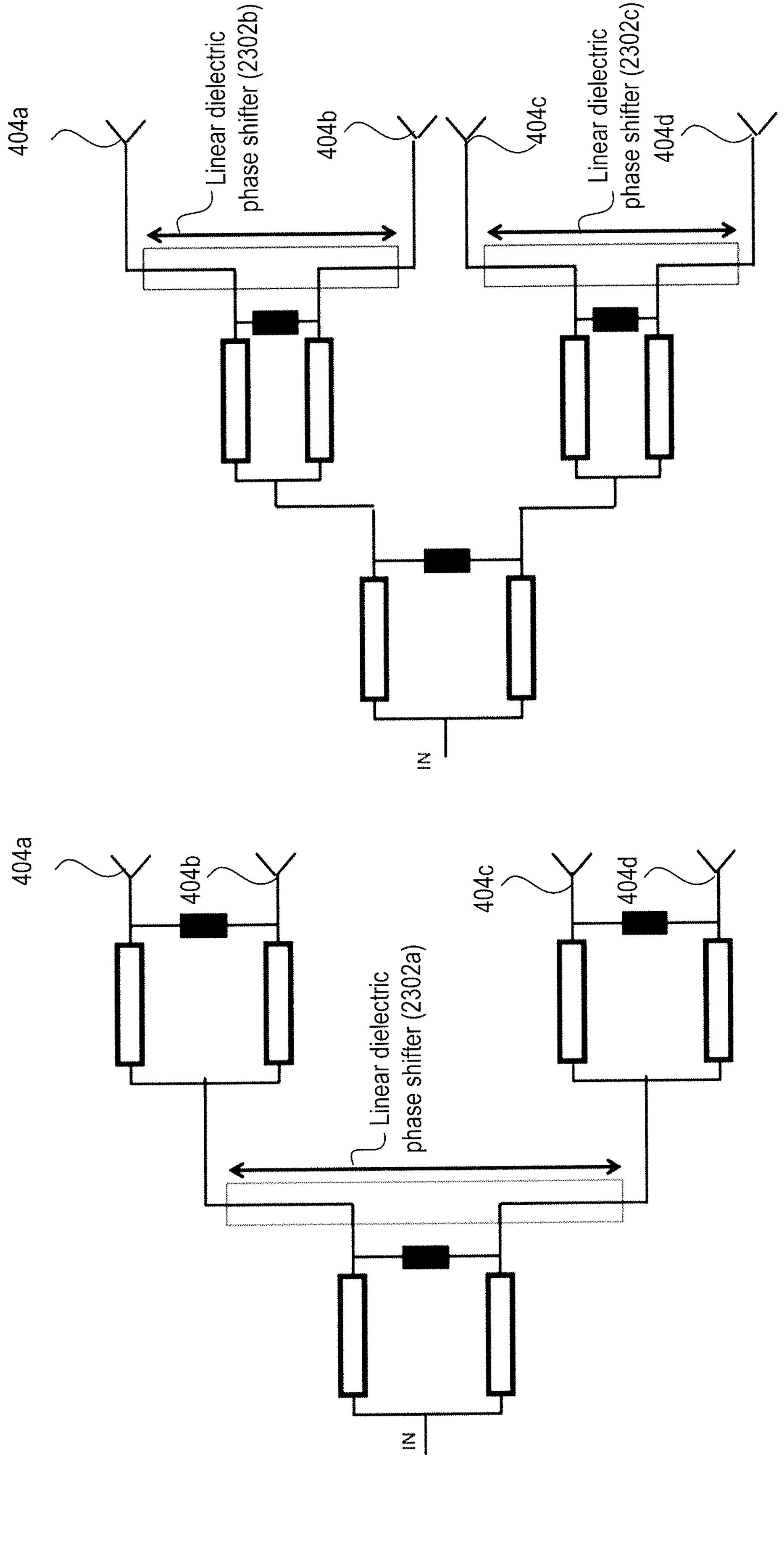
FIGS. 23*a* and *b* show schematic illustrations of further dividers according to example implementations of the present disclosure.

FIGS. 23*a* and *b* show schematic illustrations of further dividers according to example implementations of the present disclosure.

For designing antenna feeding networks with adjustable down tilt, phase shifters (2302*a-c*) may be used in antennas. Such phase shifters can be designed in various ways. For example, for dielectric phase shifters with one input and two outputs, isolating combiners can also be used to design a feeding network with no resonances in the mutual coupling signals. In FIG. 23*a*, one can see two topologies of a four-element antenna array with one or two integrated phase shifters and a Wilkinson combiner network.

The Wilkinson combiners are configured to reduce the resonant behavior of the mutual coupling signals. This resonant behavior may be critical for designs with phase shifters, because the phase changes of the phase shifter may shift resonances in frequency depending on the applied down tilt. This shift may not be controllable when using T-splitters. Isolating combiners eliminate resonances and so these feeding networks do not have such uncontrollable effects. The mutual signal phase relationship between different antenna sub-arrays stays much more stable, when changing the down-tilt. Therefore, mutual coupling calibration can also be applied to variable down-tilted antenna designs when using such isolated combiner feeding networks.

Figure 23B:
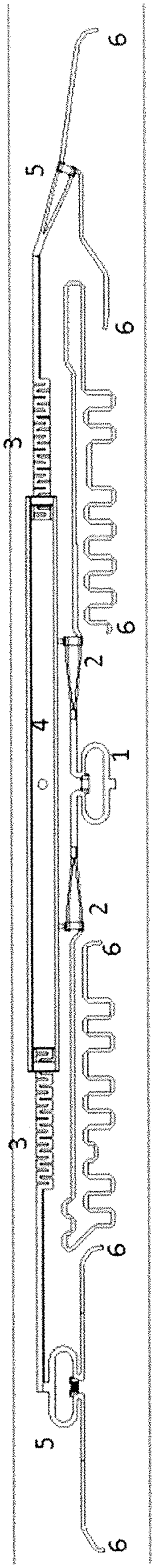

FIG. 23*b* shows an example of such a design. A Wilkinson combiner feeding network input (reference numeral 1) is provided. A Wilkinson combiner stage 2 (reference numeral 2) couples the Wilkinson combiner feeding network input to a meander line (reference numeral 3) of the dielectric linear phase shifter. The antenna further comprises a dielectric slider (reference numeral 4) of the phase shifter. A Wilkinson combiner stage 3 (reference numeral 5) is coupled to antenna element feeding points (reference numeral 6).

In this example, two phase shifters are integrated in a 6-element antenna array. The phase shifters are designed in this example with one dielectric slider, as outlined above. The slider changes the electrical length of the two meander microstrip lines and so changes the electrical length of the two antenna elements on the left and right side of this array. The down-tilt of this 6-element array can thus be adapted to the desired value. In this example, the Wilkinson network consists of one Wilkinson combiner at the input of the array, two second stage Wilkinson combiners splitting signals for the two antenna elements in the middle and the four antenna elements at the outside of this array. Two third stage Wilkinson combiners split the signal for the two antenna elements at the outside of these array. As will be appreciated, other configurations are possible.

According to example implementations as described herein, a positive effect of isolating output combiner feeding networks for massive MIMO antennas can be observed for many antennas, enabling a calibration of massive MIMO systems using mutual coupling calibration.

According to example implementations as described herein, antennae with reduced complexity and reduced costs may be provided. They show improved frequency response of mutual coupling signals, allowing for better (more precise) mutual coupling calibration in particular in massive MIMO networks. The antennae/feeding networks can easily be implemented and provided for better antenna performance compared to antennae with T-splitter feeding networks. The mutual coupling calibration algorithm can be improved.

Throughout the present disclosure, the calibration may correspond to calibrating a delay (run time of the wave) between different subarrays or branches, which may result in calibrating the phase between different subarrays/branches.

It will be appreciated that the present disclosure has been described with reference to exemplary embodiments that may be varied in many aspects. As such, the present invention is only limited by the claims that follow.

The invention claimed is:

1. An antenna comprising:

a first dual polarized radiator element and a second dual polarized radiator element, wherein the first dual polarized radiator element and the second dual polarized radiator element form a first subarray;

a third dual polarized radiator element and a fourth dual polarized radiator element, wherein the third dual polarized radiator element and the fourth dual polarized radiator element form a second subarray which is different from the first subarray, a calibration unit coupled to both of the first subarray and the second subarray, wherein the calibration unit is configured, based on a coupling signal generatable, during operation of the antenna, between the first subarray and the second subarray, to generate or receive a calibration signal for calibrating, by the calibration unit, one or both of the first subarray with respect to the second subarray and the second subarray with respect to the first subarray, the calibration relating to a phase difference between a first electrical signal provided to the first subarray and a second electrical signal provided to the second subarray during operation of the antenna, and one or both of (i) a first coupler electrically coupling the first dual polarized radiator element and the second dual polarized radiator element to each other, and (ii) a second coupler electrically coupling the third dual polarized radiator element and the fourth dual polarized radiator element to each other, wherein a said coupler is configured to flatten a frequency response between the first subarray and the second subarray, based on which the calibration signal is generated or received by the calibration unit, generatable, during operation of the antenna, between the first subarray and the second subarray, wherein the subarrays of dual polarized radiator elements are arranged in a matrix in which the subarrays form columns of the matrix, wherein the calibration of one of the columns of dual polarized radiator elements comprises calibrating said column of dual polarized radiator elements based on an average value of coupling signals radiated, during operation of the antenna, between said one of the columns of dual polarized radiator elements and corresponding, respective neighboring columns of dual polarized radiator elements.

2. The antenna as claimed in claim 1, wherein a said coupler being configured to flatten the frequency response of the coupling signal comprises reducing a frequency-dependency of an amplitude of the coupling signal.

3. The antenna as claimed in claim 1, wherein dual polarized radiator elements in one of said subarrays are in phase.

4. The antenna as claimed in claim 1, wherein one or both of the first coupler and the second coupler comprises a respective divider comprising decoupled outputs which are electrically coupled to respective ones of the dual polarized radiator elements.

5. The antenna as claimed in claim 4, wherein a said divider comprises a Wilkinson power divider.

6. The antenna as claimed in claim 4, wherein a first said divider is comprised in a first divider network electrically coupled to the dual polarized radiator elements of the first subarray and/or wherein a second said divider is comprised in a second divider network electrically coupled to the dual polarized radiator elements of the second subarray.

7. The antenna as claimed in claim 4, wherein a said divider comprises an unequal magnitude split divider.

8. The antenna as claimed in claim 1, further comprising a third subarray comprising a fifth dual polarized radiator element and a sixth dual polarized radiator element, and wherein the first subarray and the second subarray are neighboring subarrays.

9. The antenna as claimed in claim 1, wherein:

one or both of the first coupler and the second coupler comprises a respective divider comprising decoupled outputs which are electrically coupled to respective ones of the dual polarized radiator elements;

a first said divider is comprised in a first divider network electrically coupled to the dual polarized radiator elements of the first subarray and/or a second said divider is comprised in a second divider network electrically coupled to the dual polarized radiator elements of the second subarray;

the subarrays of dual polarized radiator elements are arranged in a matrix in which the subarrays form columns of the matrix; and a number of dual polarized radiator elements in a said column is n, and a number of dividers of a said divider network is n−1 and is at least 3.

10. The antenna as claimed in claim 1, wherein the matrix comprises i rows and j columns of dual polarized radiator elements, wherein $i \geq 2$ and $j \geq 2$, and wherein the calibration of a said dual polarized radiator element of a said subarray located at a position (i,j) in the matrix is based on the respective coupling signal radiated, during operation of the antenna, between the dual polarized radiator element at the position (i,j) and any dual polarized radiator elements located at positions (i,j−1) and (i,j+1), if the corresponding position is occupied by a said dual polarized radiator element.

11. The antenna as claimed in claim 10, wherein the calibration of the dual polarized radiator element of a said subarray located at the position (i,j) is further based on the respective coupling signal radiated, during operation of the antenna, between the dual polarized radiator element at the position (i,j) and any dual polarized radiator elements located at positions (i−1,j−1), (i−1,j+1), (i+1,j−1) and (i+1,j+1), if the corresponding position is occupied by a said dual polarized radiator element.

12. The antenna as claimed in claim 1, wherein the matrix comprises four columns of dual polarized radiator elements, and wherein the calibration comprises calibrating each column of dual polarized radiator elements with respect to every other column of dual polarized radiator elements.

13. The antenna as claimed in claim 1, wherein a said dual polarized radiator element is configured to radiate a signal with a first polarization and a second polarization, wherein the first polarization is different from the second polarization, and wherein the calibration of one or both of the first subarray with respect to the second subarray and the second subarray with respect to the first subarray, based on the coupling signal, is based on the coupling signal being radiated by one or both of a said dual polarized radiator element of the first subarray and a said dual polarized radiator element of the second subarray radiating a corresponding signal with the first polarization.

14. The antenna as claimed in claim 1, wherein the calibration unit is configured to calibrate one or both of the first subarray with respect to the second subarray and the second subarray with respect to the first subarray based on the coupling signal being radiated, during operation of the antenna, by both of (i) a said dual polarized radiator element of the first subarray radiating a signal with the dual polarized radiator elements of the second subarray not radiating a signal at the same time, and (ii) a said dual polarized radiator element of the second subarray radiating a signal with the dual polarized radiator elements of the first subarray not radiating a signal at the same time.

15. The antenna as claimed in claim 14, wherein:

the subarrays of dual polarized radiator elements are arranged in a matrix in which the subarrays form columns of the matrix; and the calibration unit is configured to calibrate one or both of the first subarray with respect to the second subarray and the second subarray with respect to the first subarray based on the coupling signal being radiated, during operation of the antenna, by each column of dual polarized radiator elements radiating a signal with all other columns of dual polarized radiator elements not radiating a signal at the same time.

16. The antenna as claimed in claim 15, wherein the calibration unit is configured to:

solve a phase-data matrix, generated from the coupling signals radiated from each column of dual polarized radiator elements radiating a signal with all other columns of dual polarized radiator elements not radiating a signal at the same time, and calculate phase information between all columns of dual polarized radiator elements for adapting the phase for performing beam forming of a beam emittable by the antenna.

17. The antenna as claimed in claim 1, wherein the calibration unit is configured to calibrate a said subarray further based on a scattering, S-, matrix of the antenna.

18. The antenna as claimed in claim 17, wherein the S-matrix comprises a stored initial S-matrix generated prior to the calibration being performed by the calibration unit.

* * * * *